(12) United States Patent
Fu et al.

(10) Patent No.: US 10,225,335 B2
(45) Date of Patent: Mar. 5, 2019

(54) APPARATUS, SYSTEMS AND METHODS FOR CONTAINER BASED SERVICE DEPLOYMENT

(71) Applicant: Cisco Technology, Inc., San Jose, CA (US)

(72) Inventors: Tianying Fu, San Jose, CA (US); Venkat Narayan Srinivasan, Fremont, CA (US); Jun Zhou, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/601,993

(22) Filed: May 22, 2017

(65) Prior Publication Data
US 2017/0257432 A1    Sep. 7, 2017

Related U.S. Application Data

(63) Continuation-in-part of application No. 15/013,701, filed on Feb. 2, 2016, now Pat. No. 9,661,071, and a
(Continued)

(51) Int. Cl.
*H04L 12/28* (2006.01)
*H04L 29/08* (2006.01)
*G06F 9/50* (2006.01)

(52) U.S. Cl.
CPC ........ *H04L 67/1014* (2013.01); *G06F 9/5072* (2013.01); *H04L 67/10* (2013.01);
(Continued)

(58) Field of Classification Search
None
See application file for complete search history.

(56) References Cited

U.S. PATENT DOCUMENTS

| | | |
|---|---|---|
| 6,718,535 B1 | 4/2004 | Underwood |
| 7,028,218 B2 | 4/2006 | Schwarm et al. |
| (Continued) | | |

OTHER PUBLICATIONS

"Third-Party Submission under 37 CFR 1.290 Concise Description of Relevance," filed in U.S. Appl. No. 14/497,196 on Feb. 18, 2015.

*Primary Examiner* — Alex Skripnikov
*Assistant Examiner* — Lionel Preval
(74) *Attorney, Agent, or Firm* — Parker Ibrahim & Berg LLP; James M. Behmke; Stephen D. LeBarron

(57) ABSTRACT

Embodiments disclosed facilitate distributed orchestration and deployment of a single instance of a distributed computing application over a plurality of clouds and container clusters, including container clusters provided through a Container as a Service (CaaS) offering. In some embodiments, system and pattern constructs associated with a hybrid distributed multi-tier application may be used to obtain an infrastructure independent representation of the distributed multi-tier application. The infrastructure independent representation may comprise a representation of an underlying pattern of resource utilization of the application. Further, the underlying pattern of resource utilization of the application may be neither cloud specific nor container cluster specific. In some embodiments, a single instance of the hybrid distributed multi-tier application may be deployed on a plurality of cloud infrastructures and on at least one container cluster, based, in part, on the cloud-infrastructure independent representation of the application.

20 Claims, 14 Drawing Sheets

Related U.S. Application Data continuation of application No. 14/497,196, filed on Sep. 25, 2014, now Pat. No. 9,307,019, and a continuation of application No. 13/024,302, filed on Feb. 9, 2011, now Pat. No. 8,862,933.

(52) U.S. Cl.
CPC ...... *H04L 67/1097* (2013.01); *H04L 67/2823* (2013.01); *H04L 67/34* (2013.01)

(56) References Cited

U.S. PATENT DOCUMENTS

| | | |
|---|---|---|
| 7,523,190 B1 | 4/2009 | Bickerstaff et al. |
| 7,809,975 B2 | 10/2010 | French |
| 7,849,350 B2 | 12/2010 | French |
| 7,853,767 B2 | 12/2010 | Maki |
| 8,090,979 B2 | 1/2012 | Watanabe et al. |
| 8,176,208 B2 | 5/2012 | Shishido |
| 8,250,215 B2 | 8/2012 | Stienhans et al. |
| 8,386,839 B2 | 2/2013 | Watanabe et al. |
| 8,489,918 B2 | 7/2013 | Watanabe et al. |
| 8,904,005 B2 | 12/2014 | Ferris et al. |
| 2002/0013895 A1 | 1/2002 | Kelley et al. |
| 2002/0120741 A1 | 8/2002 | Webb et al. |
| 2004/0098458 A1 | 5/2004 | Husain et al. |
| 2007/0083650 A1 | 4/2007 | Collomb et al. |
| 2007/0260702 A1 | 11/2007 | Richardson et al. |
| 2008/0104393 A1 | 5/2008 | Glasser et al. |
| 2008/0196025 A1* | 8/2008 | Meijer .................... G06F 8/45 717/177 |
| 2009/0216975 A1 | 8/2009 | Halperin et al. |
| 2009/0300151 A1 | 12/2009 | Friedman et al. |
| 2010/0042720 A1 | 2/2010 | Stienhans et al. |
| 2010/0061250 A1 | 3/2010 | Nugent |
| 2010/0070319 A1 | 3/2010 | Prafullchandra et al. |
| 2010/0088150 A1 | 4/2010 | Mazhar et al. |
| 2010/0125476 A1 | 5/2010 | Yeom et al. |
| 2010/0125844 A1 | 5/2010 | Mousseau et al. |
| 2010/0191796 A1 | 7/2010 | Almeida et al. |
| 2010/0199285 A1* | 8/2010 | Medovich ........... G06F 9/45533 718/104 |
| 2010/0228819 A1 | 9/2010 | Wei |
| 2010/0235830 A1 | 9/2010 | Shukla et al. |
| 2010/0251328 A1 | 9/2010 | Syed et al. |
| 2010/0306772 A1 | 12/2010 | Arnold et al. |
| 2010/0332617 A1 | 12/2010 | Goodwin et al. |
| 2011/0016214 A1 | 1/2011 | Jackson |
| 2011/0022812 A1 | 1/2011 | Van Der Linden et al. |
| 2011/0072487 A1 | 3/2011 | Hadar et al. |
| 2011/0087690 A1 | 4/2011 | Cairns |
| 2011/0110377 A1 | 5/2011 | Alkhatib et al. |
| 2011/0153697 A1 | 6/2011 | Nickolov et al. |
| 2011/0185292 A1 | 7/2011 | Chawla et al. |
| 2011/0231899 A1 | 9/2011 | Pulier et al. |
| 2011/0265164 A1 | 10/2011 | Lucovsky et al. |
| 2011/0296023 A1 | 12/2011 | Ferris et al. |
| 2011/0302312 A1 | 12/2011 | McCrory |
| 2011/0320821 A1 | 12/2011 | Alkhatib et al. |
| 2012/0131591 A1 | 5/2012 | Moorthi et al. |
| 2012/0158803 A1 | 6/2012 | Kandasamy et al. |
| 2012/0159459 A1 | 6/2012 | Turner et al. |
| 2012/0179820 A1 | 7/2012 | Ringdahl et al. |
| 2012/0203823 A1* | 8/2012 | Manglik ............... G06F 9/5072 709/203 |
| 2012/0222104 A1 | 8/2012 | Boldyrev et al. |
| 2012/0236761 A1 | 9/2012 | Yang et al. |
| 2012/0239739 A1 | 9/2012 | Manglik et al. |
| 2012/0254966 A1 | 10/2012 | Parker |
| 2012/0281708 A1 | 11/2012 | Chauhan et al. |
| 2012/0284380 A1 | 11/2012 | Anderson, III et al. |
| 2012/0297066 A1 | 11/2012 | Hewett |
| 2012/0303778 A1 | 11/2012 | Ahiska et al. |
| 2012/0311156 A1 | 12/2012 | Dejana et al. |
| 2012/0331528 A1 | 12/2012 | Fu et al. |
| 2013/0066940 A1 | 3/2013 | Shao |
| 2013/0151598 A1 | 6/2013 | Fu et al. |
| 2013/0179573 A1 | 7/2013 | McCarty |
| 2014/0040656 A1 | 2/2014 | Ho et al. |
| 2014/0372533 A1 | 12/2014 | Fu et al. |
| 2015/0039770 A1 | 2/2015 | Manglik et al. |
| 2015/0121078 A1 | 4/2015 | Fu et al. |

* cited by examiner

700

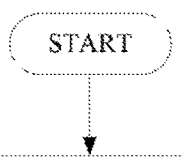

710
Obtain, based, in part, on system and pattern constructs associated with a hybrid distributed multi-tier application, an infrastructure independent representation of the hybrid distributed multi-tier application, wherein the infrastructure independent representation comprises a representation of an underlying pattern of resource utilization of the application, wherein the underlying pattern of resource utilization of the application is not: (a) cloud specific and (b) container cluster specific;

720
Deploy a single instance of the hybrid distributed multi-tier application on a plurality of cloud infrastructures and on at least one container cluster, based, in part, on the infrastructure independent representation of the hybrid distributed multi-tier application

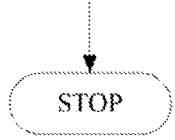

FIG. 12

APPARATUS, SYSTEMS AND METHODS FOR CONTAINER BASED SERVICE DEPLOYMENT

CROSS REFERENCE TO RELATED APPLICATIONS

This application is a continuation-in-part of U.S. patent application Ser. No. 15/013,701 entitled "Apparatus, Systems and Methods for Deployment and Management of Distributed Computing Systems and Applications," filed Feb. 2, 2016, which, in turn, is a continuation of U.S. patent application Ser. No. 14/497,196 entitled "Apparatus, Systems, and Methods for Deployment and Management of Distributed Computing Systems and Applications," filed Sep. 25, 2014, which, in turn, is a continuation of U.S. patent application Ser. No. 13/024,302 (now U.S. Pat. No. 8,862,933) entitled "Apparatus, Systems, and Methods for Deployment and Management of Distributed Computing Systems and Applications," filed Feb. 9, 2011. The above applications are hereby incorporated by reference in their entireties herein for all purposes.

BACKGROUND

Field of the Invention

The present invention relates to the field of distributed computing and in particular, to apparatus, systems, and methods to facilitate deployment of container based services on distributed computing systems including clouds.

Description of Related Art

The performance of computing applications may often be increased by distributing the computational workload across a networked cluster of computers. A physical networked cluster of computers with attendant software facilitating virtualization is often referred to as a "cloud" or "cloud infrastructure" or simply an infrastructure. Cloud computing facilitates on-demand access to resources, which may be rapidly scaled up or down in proportion to user requirements. A VM may be viewed as some fraction of the hardware (e.g. CPU, storage, etc.) and software (e.g. Operating System (OS) etc.) provided by a cloud. Thus, each VM (which typically includes some fraction of the underlying cloud hardware and an Operating System) can be used to deploy and run on or more cloud based applications.

Applications can sometimes be deployed on a host infrastructure in the form of "containers" or "application containers." One distinction between an application container and a VM is that multiple application containers (e.g. each corresponding to a different application) may be deployed over a single OS, whereas, each VM typically runs a separate OS. Thus, containers are often less resource intensive and may facilitate better utilization of underlying host hardware resources. However, application containers that run on a single host are susceptible to host failure, which may result in failure of the entire software system that the application containers constitute. In addition, application containers that run on a single host may also be limited by host resource constraints. Thus, many systems run on a collection of container hosts termed "container clusters."

To simplify container/container cluster deployment, containers or container clusters are often delivered as a service. Container as a Service (CaaS) refers to container-based infrastructure services involving the delivery of container cluster management, container orchestration, and the underlying computational resources to end-users as a service (e.g. from a cloud infrastructure provider). CaaS solutions are typically utilized by application developers to deploy new container-based applications.

However, because CaaS offerings by cloud providers may differ in in terms of cluster management, container deployment, scaling, reporting, lifecycle management etc., system developers are often faced with the task of rewriting or manually configuring code to deploy the system on different providers resulting in inefficiencies, duplicated effort, the potential for errors, and increased maintenance costs. Moreover, cloud software is typically a hybrid of VM-based applications and container based applications. Deploying, migrating, and maintaining hybrid cloud software that is a mix of VM-based applications and container-based applications between various cloud providers presents additional challenges.

Therefore, there is a need for apparatus, systems, and methods to facilitate efficient deployment of distributed applications including container and cloud-based applications across a plurality of container cluster and cloud providers.

SUMMARY

In some embodiments, a processor-implemented method may comprise: obtaining, based, in part, on system and pattern constructs associated with a hybrid distributed multi-tier application, an infrastructure independent representation of the hybrid distributed multi-tier application, wherein the infrastructure independent representation comprises a representation of an underlying pattern of resource utilization of the application, wherein the underlying pattern of resource utilization of the application is not: (a) cloud specific and (b) container cluster specific; and deploying a single instance of the hybrid distributed multi-tier application on a plurality of cloud infrastructures and on at least one container cluster, based, in part, on the infrastructure independent representation of the hybrid distributed multi-tier application.

In another aspect, a computer system may comprise a processor coupled to a memory and a network interface, wherein the processor is configured to: obtain, based, in part, on system and pattern constructs associated with a hybrid distributed multi-tier application, an infrastructure independent representation of the hybrid distributed multi-tier application, wherein the infrastructure independent representation comprises a representation of an underlying pattern of resource utilization of the application, wherein the underlying pattern of resource utilization of the application is not: (a) cloud specific and (b) container cluster specific; and deploy, using the network interface, a single instance of the hybrid distributed multi-tier application on a plurality of cloud infrastructures and on at least one container cluster, based, in part, on the infrastructure independent representation of the hybrid distributed multi-tier application.

Some disclosed embodiments also pertain to a non-transitory computer-readable medium comprising instructions to configure a processor to: obtain, based, in part, on system and pattern constructs associated with a hybrid distributed multi-tier application, an infrastructure independent representation of the hybrid distributed multi-tier application, wherein the infrastructure independent representation comprises a representation of an underlying pattern of resource utilization of the application, wherein the underlying pattern of resource utilization of the application is not: (a) cloud specific and (b) container cluster specific; and deploy a single instance of the hybrid distributed multi-tier application on a plurality of cloud infrastructures and on at least one container cluster, based, in part, on the infrastructure independent representation of the hybrid distributed multi-tier application.

Consistent with embodiments disclosed herein, various exemplary apparatus, systems, and methods for facilitating the orchestration and deployment of cloud-based applications are described. Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

BRIEF DESCRIPTION OF THE DRAWINGS

FIG. 12 shows a flowchart for an exemplary method for orchestrating and deploying a single instance of a distributed computing application on a plurality of clouds and/or container clusters.

DETAILED DESCRIPTION

Figure 1:
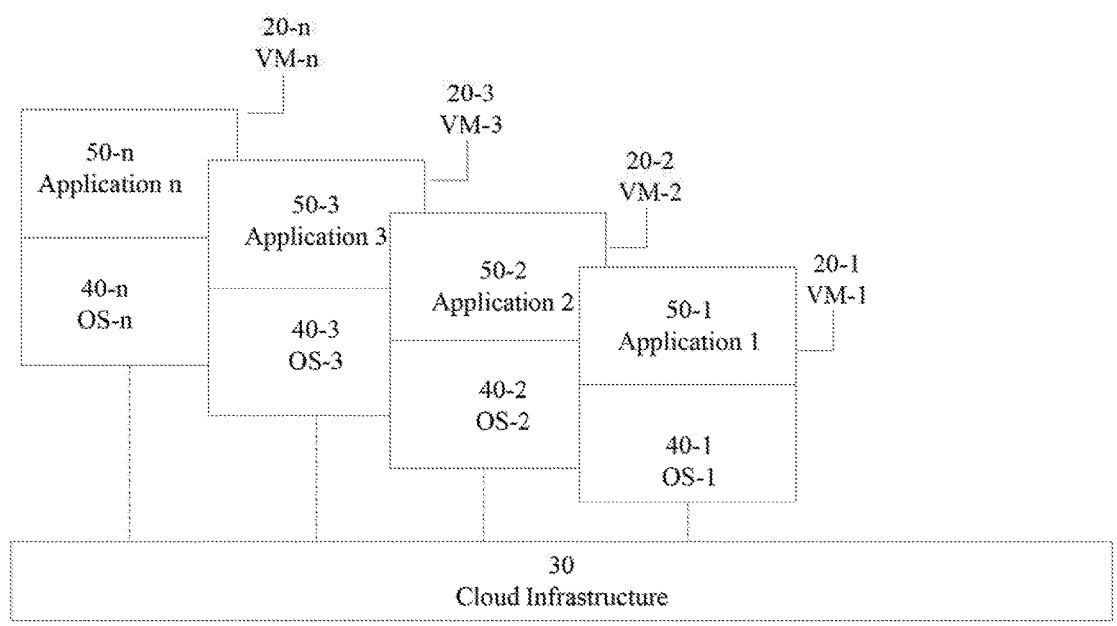
FIG. 1 shows an exemplary architecture of a cloud based application.

In accordance with embodiments disclosed herein, apparatus, systems, and methods to facilitate distributed application orchestration and deployment of cloud-based applications are presented.

The performance of computing applications may often be increased by distributing the computational workload across a networked cluster of computers. A physical networked cluster of computers with attendant software facilitating virtualization is often referred to as a "cloud" or "cloud infrastructure" or simply an infrastructure. Cloud computing facilitates on-demand access to resources, which may be rapidly scaled up or down in proportion to user requirements. The software permits the underlying physical hardware associated with clouds, which can include servers, memory, storage, and network resources, to be viewed as virtualized units. These virtualized units represent some fraction of the underlying computing hardware or resources supported by the cloud infrastructure. Therefore, from a logical perspective, clouds may be viewed as a collection of Virtual Machines (VMs), each configured with some fraction of the underlying hardware resources. Typically, a cloud may provide a variety of VM types with different computing (CPU), memory, storage, networking, and Operating System (OS) options.

Clouds may be public and/or private. For example, publicly available clouds or "public clouds," may be accessed programmatically (e.g. using Application Programming Interfaces (APIs)) over the Internet and may be made available as virtual machines (VMs) on a pay-per-use basis by third parties to customers. On the other hand, organizations may have private clouds for use by employees or customers within an enterprise's data center and/or may use a hybrid cloud, which may be a combination of public-private clouds to deploy and run applications. A VM may be viewed as some fraction of the hardware (e.g. CPU, storage, etc.) and software (e.g. Operating System (OS) etc.) provided by a cloud. Thus, each VM (which typically includes some fraction of the underlying cloud hardware and an Operating System) can be used to deploy and run on or more cloud based applications. Clouds, thus, provide access to computing infrastructure remotely, including compute, storage, and network resources, so that the resources can be reserved, provisioned, accessed, and released programmatically. For example, programmatic interfaces such as Application Programming Interfaces (APIs), System Development Kits (SDKs), Web Services, etc. may be used to access resources made available by clouds remotely over a wide-area network (WAN).

VMs are typically software implementations of a computer. VMs often provide a complete system platform, which may also support the execution of a complete operating system by the VM in addition to one or more applications. One method of deploying VMs on clouds may use images termed Virtual Machine Images (VMIs), which are typically file system images including an operating system, application servers and/or application(s) to be executed by the VM, data, and a cloud specific portion.

Cloud computing may thus be viewed broadly in terms of the following models. In the Infrastructure-as-a-Service (IaaS) model, cloud providers supply the compute, network and storage mechanisms but cloud customers may run, manage, and configure their (e.g. operating system and applications) own VMs. In systems based on an IaaS model, the provider may manage the underlying physical cloud infrastructure. In the Platform-as-a-Service (PaaS) model, cloud providers supply a platform, which includes a preconfigured software stack, upon which customers may run applications. In systems based on a PaaS model, the PaaS provider may manage the platform (infrastructure and software stack), while the run-time execution environment may be managed by users. In the Software-as-a-Service (SaaS) model, the cloud provider may additionally provide ready to use software applications such as financial or business applications for customer use. In systems based on an SaaS model, the SaaS provider may manage the cloud infrastructure, any software stacks, and the ready to use applications.

A "cloud node" or "node" may be responsible for the control and operation of one or more VMs, and there may be several nodes per cloud. In some embodiments, one or more cloud nodes may be involved in orchestration, including the start up, monitoring, tear down and/or migrations of applications running on a cloud. Because of virtualization and depending on the resources allocated to a cloud node, the cloud node may take the form of a virtual server, which may be implemented, in part, by using one or more physical processors or some fraction thereof of the available processing power.

Applications can sometimes be deployed on a host infrastructure in the form of "containers" or "application containers." The term "container" or "application container" as used herein, refers to an isolation unit or environment within a single operating system and specific to a running program. When executed in their respective containers, one or more programs or scripts may run sandboxed on a single VM using operating system virtualization, which facilitates rebooting, provision of IP addresses, separate memory, processes etc. to the respective containers. Containers may take the form of a package (e.g. an image), which may include the application, application dependencies (e.g. services used by the application), the application's runtime environment (e.g. environment variables, privileges etc.), application libraries, other executables, and configuration files. One distinction between an application container and a VM is that multiple application containers (e.g. each corresponding to a different application) may be deployed over a single OS, whereas, each VM typically runs a separate OS. Thus, containers are often less resource intensive and may facilitate better utilization of underlying host hardware resources. For example, a multi-tier application may include a server-side scripting container (e.g. a PHP container), a database process container (e.g. a MySQL container), a container for the web server (e.g. an Nginx ("engine-X") container), etc., which may run over a single host OS. Containers facilitate the building of an application using components running in sandboxed or compartmentalized environments. Thus, containerized applications are less likely to interfere with or disrupt the operation of another container. Application containers can be independent of the configuration of the underlying OS, networking interfaces, and storage thereby facilitating portability. For example, a container platform may facilitate application container portability by allowing the same application container to be deployed on hardware with various host OS types, OS versions etc.

However, application containers that run on a single host are susceptible to host failure, which may result in failure of the entire software system that the application containers constitute. In addition, application containers that run on a single host may also be limited by host resource constraints. Thus, many systems run on a collection of container hosts termed "container clusters." Container clusters represent cloud resources that support containerized workloads across multiple hosts and/or VMs. The containerized workloads or tasks may be viewed a logical grouping of application containers that deliver some desired functionality. Container cluster managers (e.g. Kubernetes, Mesos, Docker Swarm, etc.) provide functionality to manage container clusters. To simplify container cluster deployment, containers are often delivered as a service. The term "Container as a Service" (CaaS) refers to container-based virtualization involving the delivery of container cluster management, container orchestration, and the underlying computational resources to end-users as a service (e.g. from a cloud infrastructure provider). CaaS solutions are typically utilized by application developers to deploy new container-based applications.

Many real-world applications are a mix of container-based applications (e.g. which may run on a container cluster) and cloud/VM based applications (e.g. which run on VMs in a cloud infrastructure). The term "container-based application" is used to refer to an application or a portion of an application, or an application tier that includes one or more application containers. The term "VM based application," as used herein, is used to refer to non-containerized distributed applications, or a portion of a non-containerized distributed application, or a non-containerized distributed application tier that may be instantiated on one or more VMs, which may be in a cloud. The term "hybrid distributed application" or "hybrid application" is used to refer to an application that includes both container-based applications and VM based applications. For example, a hybrid multi-tier application may have one or more container-based tiers and one or more cloud-based tiers.

In conventional schemes, for users who deploy or desire to deploy one or more such applications (e.g. container-based or hybrid applications) on multiple container clusters and/or multiple clouds, the process of deploying applications can be inefficient and cumbersome. For example, for a container-based application, even when container clusters are provided as a CaaS, the CaaS offerings by different cloud providers may differ in in terms of cluster management, container deployment, scaling, reporting, lifecycle management etc. Thus, system developers are often faced with the task of rewriting code or reconfiguring application parameters if they plan to deploy the container-based application on multiple cloud providers, which is inefficient, cumbersome, increases the likelihood of errors and increases software maintenance costs (e.g. when the code is changed and/or there are changes in one or more CaaS offerings). Moreover, software is typically a hybrid of VM-based applications and container based applications. Migrating hybrid application software that is a mix of VM-based applications and container-based applications between providers presents additional challenges.

Disclosed embodiments facilitate the distributed orchestration and deployment of distributed applications, including container-based and hybrid distributed applications across a plurality of distinct clouds or cloud providers. The term "distinct cloud" or "distinct cloud provider" is used to refer to cloud or service (e.g. IaaS, PaaS, SaaS, and/or CaaS) offerings by different cloud providers. For example, Amazon™ AWS, Microsoft™ Azure represent distinct cloud infrastructure systems/providers. Similarly, Amazon™ AWS ECS, Microsoft™ Azure ACS, Kubernetes, and Mesos represent different container cluster and CaaS system providers. In some embodiments, the distributed orchestration and deployment may be based on an infrastructure agnostic or infrastructure independent representation of the hybrid distributed application, which may facilitate orchestration and deployment of the hybrid distributed application across one or more distinct clouds and/or container clusters.

The terms "infrastructure independent representation" and "infrastructure agnostic representation" are used synonymously herein, and refer to a representation of a distributed computing application that may be deployed on a plurality of distinct clouds and/or distinct container clusters. While an "infrastructure independent" or "infrastructure agnostic" representation may be deployed on different configurations of the same cloud/container cluster (e.g. deployed on two different configurations of an Azure cloud or deployed two different configurations of a Mesos container cluster), the terms "infrastructure independent" or "infrastructure agnostic" representation indicate, additionally, that the infrastructure independent or infrastructure agnostic representation of an application may also be deployed on distinct cloud providers and/or container cluster/CaaS providers.

The "infrastructure independent representation" or "infrastructure agnostic representation" may include a representation of an underlying pattern of execution and/or resource utilization of the distributed computing application. In some embodiments, the "infrastructure independent representation" or "infrastructure agnostic representation" may take the form of application descriptors and/or metadata that are not specific to any particular cloud and/or container cluster. The "infrastructure agnostic representation" or "infrastructure independent representation" may be used to obtain cloud specific and/or container cluster/CaaS specific commands and/or parameters, at the time of orchestration and/or deployment of the distributed computing application on one or more specific clouds/container cluster in a manner consistent with embodiments disclosed herein. For example, for a container-based application, an infrastructure independent representation of the container-based application may be used to deploy the container-based application on a plurality of distinct container-clusters/CaaS providers. As another example, for a hybrid application (e.g. a multi-tier application with one or more container-based application layers and one or more VM-based application layers), an infrastructure independent representation of the hybrid application may be used to deploy the hybrid application on: (a) a plurality of distinct container-clusters/CaaS providers, and (b) on a plurality of distinct clouds. In some embodiments, the infrastructure independent representation may be deployed seamlessly across a plurality of distinct clouds and/or distinct container-clusters/CaaS providers without recoding and/or code changes to the infrastructure independent representation.

Disclosed embodiments thus facilitate seamless orchestration, deployment, and migration of container-based, VM-based, and hybrid distributed applications on a plurality of distinct container-clusters/CaaS providers, and/or on a plurality of distinct clouds. Disclosed embodiments also reduce inefficiencies associated with developing, maintenance, and testing of distributed applications, in part, because a single infrastructure independent representation of the distributed application may be developed and tested for a plurality of distinct container-clusters/CaaS providers, and/or on a plurality of distinct clouds. The infrastructure independent representation of the distributed application may be deployed on a plurality of distinct container-clusters/CaaS providers, and/or on a plurality of distinct clouds. A reduction of maintenance costs may result because when there are: (i) code changes/upgrades to the application and/or (ii) changes/upgrades by cloud and/or container-cluster/CaaS providers, and/or (iii) changes to cloud and/or container-cluster/CaaS offerings (e.g. addition/deletion of new clouds/container cluster/CaaS providers), these changes may be reflected with corresponding changes to the single infrastructure independent representation.

To deploy a distributed application, resources (compute, storage, network, services etc.) for the application may be provisioned, and one more services that components of the application depend upon may be started in some specified order in a process termed orchestration. For example, for a VM-based cloud application, an initialization script may be launched after a VM is booted for the first time, which may specify a sequence of tasks (installing and/or configuring software, etc.) to be performed. In general, orchestration refers to the automation (or partial automation) of a variety of tasks related to managing and coordinating software, resources, and services on a cloud and/or container cluster. Upon completion of orchestration, the system may deliver some defined functionality. Thus, orchestration stitches together software and hardware components in the cloud to deliver the desired functionality. In some embodiments, workflows may be used to specify how the software and hardware components are brought up and stitched together to deliver the desired functionality.

In some embodiments, for a hybrid distributed application, the orchestrator may take the form of a cloud based Distributed Orchestration Engine (DOE). In some embodiments, the DOE may comprise a plurality of DOE nodes (e.g. VM servers), which may interface with the cloud infrastructure(s) or cloud provider(s) and the container cluster/CaaS platform. In some embodiments, the DOE may configure the clouds and/or container cluster/CaaS platform to deploy the hybrid distributed application and to coordinate between: (a) the VM-based portions of the hybrid distributed application; and (b) the VM-based portions of the hybrid distributed application container-based portions of the hybrid distributed application. Consistent with some disclosed embodiments, the DOE may facilitate orchestration across multiple distinct clouds and/or multiple container clusters/CaaS platforms, based, in part, on an infrastructure agnostic representation of the cloud-based distributed computing application.

FIG. 1 shows an exemplary architecture 10 to support deployment of a cloud-based application. A distributed computing application may include a plurality of components such as Application 1 50-1, Application 2 50-2, Application 3 50-3 . . . Application n 50-*n*. As shown in FIG. 1, Application 1 50-1, Application 2 50-2, Application 3 50-3 . . . Application n 50-*n* run on VM-1 20-1, VM-2 20-2, VM-3 20-3 . . . VM-n 20-*n*, respectively. Virtual machines VM-1 20-1, VM-2 20-2, VM-3 20-3 . . . VM 20-*n* run over Cloud Infrastructure 30. Each of VM-1 20-1, VM-2 20-2, VM-3 20-3 . . . VM 20-*n* may also run a corresponding operating system OS-1 40-1, OS-2 40-2, OS-3 40-3 . . . OS-n 40-*n*, respectively.

Figure 2:
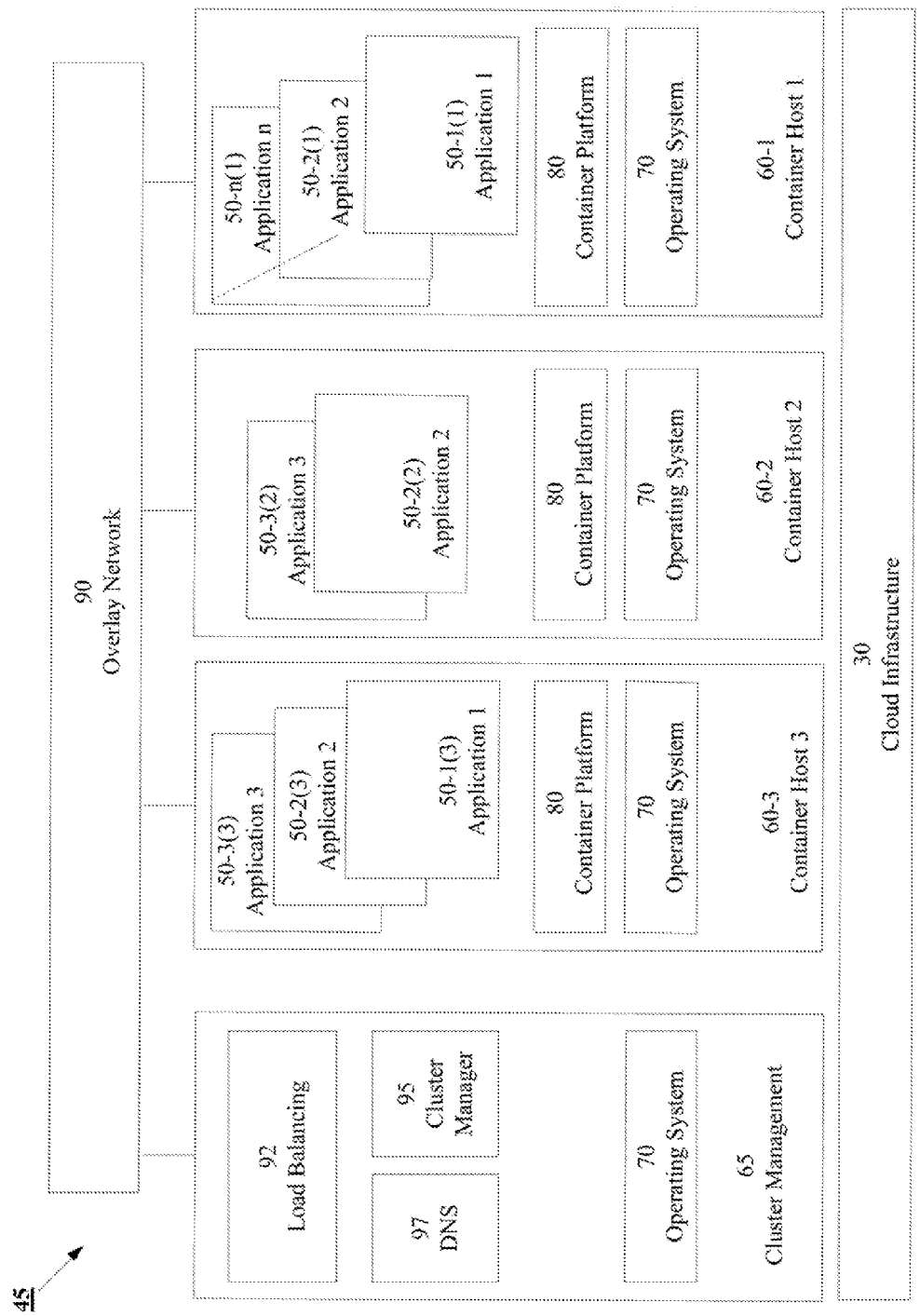
FIG. 2 shows an exemplary architecture of a container cluster.

FIG. 2 shows an exemplary architecture of a container cluster 45. Container cluster 45 may include container host 1 60-1, container host 2 60-2, and container host 3 60-3, which may run over cloud infrastructure 30. Container cluster 45 is merely exemplary. In general, container cluster may include several container hosts. Each container host 60-1, 60-2, and 60-3 may run operating system 70 and container platform 80. Container platform 80 may provide functionality to run a plurality of application containers, which may be isolated from each other. Container cluster 45 may be configured to run a distributed computing application, which may include a plurality of components such as Application 1 50-1, Application 2 50-2, Application 3 50-3 . . . Application n 50-*n*.

For example, as shown in FIG. 2, container host 60-1 may run a first instance of Application 1 50-1(1), Application 2 50-2(1), Application 3 50-3(1) . . . Application n 50-*n*(1) as containers, where the numbers in parentheses indicate the container host that runs the application. Further, container host 2 60-2 may run another instance of one or more application containers such as Application 2 50-2(2) and Application 3 50-3(2), while container host 60-3 may run further application container instances shown as Application 1 50-1(3), Application 2 50-2(3), Application 3 50-3(3) in FIG. 2.

Container cluster 45 may also include cluster management block 65, which may manage scaling (the addition and/or deletion of container hosts), facilitate discovery and communication between application containers (e.g. Application 1 50-1(1) and Application 3 50-3(3)), and determine the container host to be used to run an application container instance. For example, as shown in FIG. 2, cluster management block 65 may include Cluster Manager 95, DNS component 97, and load balancing component 92. Load balancing component 92 may monitor the utilization of application container instances to distribute the workload. For example, load balancing component 92 may ensure that each application container instance (e.g. Application 2 50-2 (1), Application 2 50-2(2), and Application 1 50-1(3)) are busy and that no application container instance is overloaded. Cluster manager may perform functions such as application container scheduling (e.g. place application containers 50 on container hosts 60, monitor container host resource utilization etc.), application container recovery/restart (e.g. in the event of failure or other faults), container scaling (increase or decreasing the number of application container instances), logging, etc.

DNS component 97 may provide domain names for containers, and domain names for the container cluster. For example, DNS component 97 may assign and/or register domain names to one or more application containers 50 and to container cluster 45 thereby facilitating access to and communication with application containers 50 and container cluster 45.

In some instances, container cluster 45 may also include an overlay network 90, which may facilitate communication between container cluster entities. For example, overlay network 90 may facilitate communication between application containers 50, and between cluster management block 65 and one or more application containers 50. Overlay network 90 may be implemented using software defined networking and may be configured by cluster manager 95.

Because VMs (e.g. VM 20-1 . . . 20-*n* shown in FIG. 1) may provide a complete system platform including a complete operating system and one or more applications, deploying a distributed application using VMs on a cloud may consume a relatively greater proportion of cloud infrastructure resources when compared to the running the same distributed application on a container cluster.

Figure 3A:
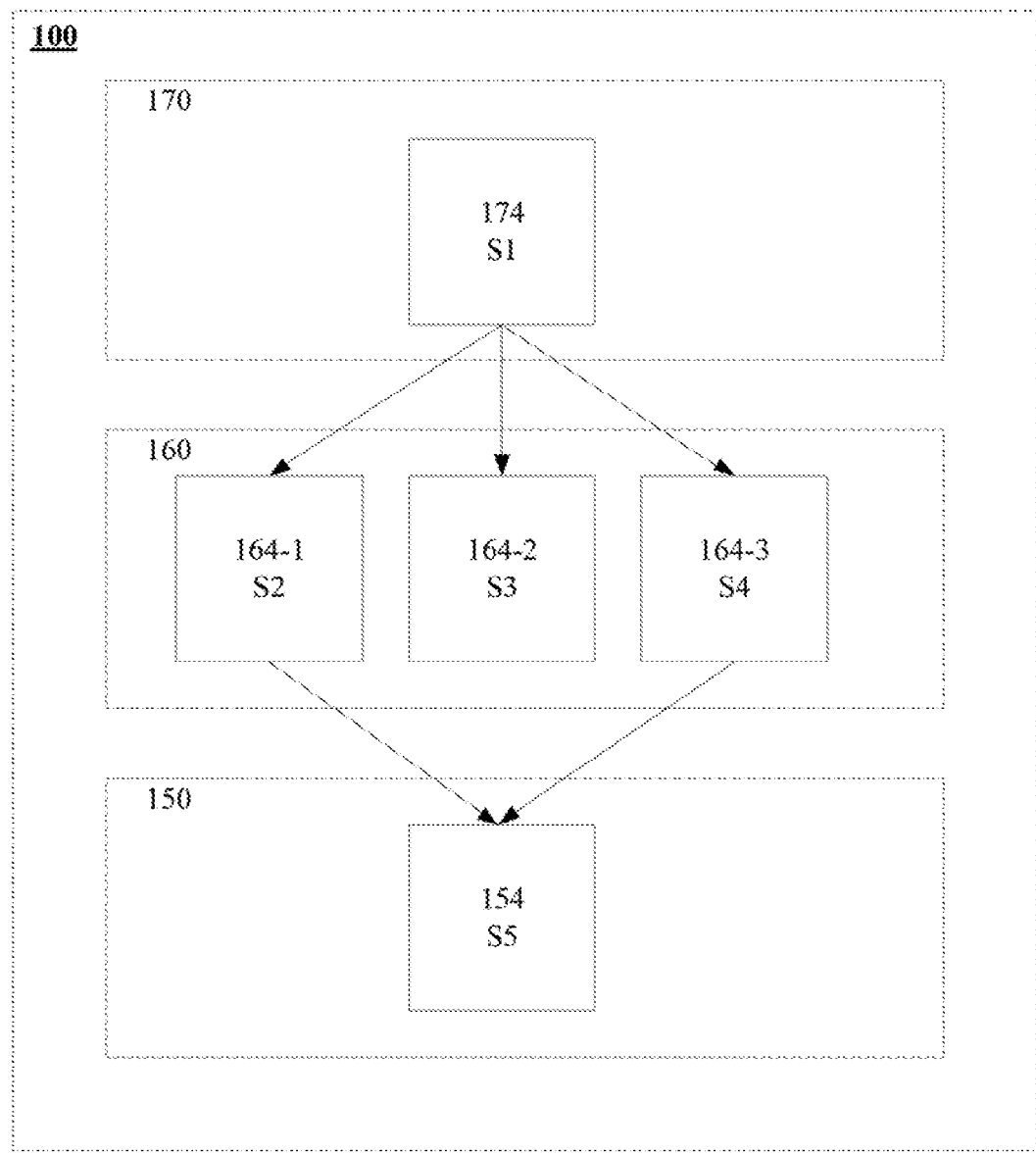
FIG. 3A shows multi-tier distributed application illustrating service dependencies between components of the multi-tier distributed application.

FIG. 3A illustrates an exemplary multi-tier cloud application illustrating an initialization sequence based on service dependencies. The term multi-tier application refers to applications that exhibit and/or are structured in, tiers or layers, where each tier or layer may provide one or more services. Except where otherwise specified, the term "service" as used herein refers broadly to software that facilitates delivery of functionality, content etc, over a network (including, for example, web server services, database services, load balancing services, caching services etc) and/or applications which may include standalone program code and/or program code that functions in combination with one or more of the above "services".

The term "end point based service" is used to refer to categories of services where the service provider makes available both a computing platform and a solution stack associated with the platform as a service to users. End-point based services may be available, for example, from one or more vendors. External endpoint based services or external endpoints refer to services that are external to distributed application (e.g. a multi-tier hybrid application), where the services are accessible from within the distributed application. For example, an end-point based CaaS (e.g. Kubernetes, or Docker Swarm) may be used to deploy the container application portion of a hybrid application. As another example, Amazon Relational Database Service (RDS) provided by Amazon™ may be used to set up a cloud-based relational database that is accessible to and/or may be used by a deployed hybrid multi-tier application, which may be generated from cloud agnostic representation of multi-tier application.

For example, a multi-tier application may include three tiers, which may take the form of a web tier, application tier, and a database tier. Each tier may comprise one or more services. The web tier may provide services to manage incoming hypertext transfer protocol ("http") requests. The web-tier may serve the static content and make REpresentational State Transfer calls or RESTful calls to the application layer. REST is a stateless client-server, cacheable communications protocol, which may use the HTTP protocol to effect the creation, updating, reading, and/or deletion of data. The application tier may provide application specific services such as business logic based on input received from the web tier and services to generate queries to and/or process response received from the database tier. Services in the database tier may process queries received from the application tier, retrieve data from a database, and send query responses to the application tier, which, in turn, may process the received responses and provide the processed data to the web tier.

Further, each tier in the multi-tier cloud based application may include one or more IaaS, and/or PaaS, and/or SaaS and/or CaaS components. In some embodiments, a multi-tier application may be structured or configured so that application components in one tier of the multi-tier application may be dependent on one or more components in an immediately preceding tier. The term "component," or "application component" when used in the context of an application, is used herein to refer to a discrete logical unit of an application. A component may include one or more additional components. For example, a component may be a service, a nested application within a larger application, standalone program code, etc.

FIG. 3A shows an exemplary hybrid distributed multi-tier application 100 with five services illustrating an initialization sequence based on dependencies among the services.

In general, as shown in FIG. 3A, there are dependencies between services in different application tiers in a multi-tier application. The application topology of a multi-tier application may include a representation of the tiers, the services in each tier and the dependencies between services in the multi-tier application. For an application that includes a plurality of components, the term "application topology" refers to the pattern of dependencies between the components. For example, these dependencies may determine sequences specific to starting, running, migrating, updating, terminating, and/or performing other actions related to the multi-tier cloud based application. In some embodiments, the dependencies may also specify and/or be used to obtain a sequence of events to deploy an application with one or more clouds or container clusters. For example, the dependencies in a multi-tier application may be used to determine an order or sequence for starting services in the multi-tier application.

In general, dependency information may include information about pre-requisites for starting, deploying, and/or running a service. Dependency information may include information about service dependencies, residence dependencies, runtime dependencies, resource dependencies etc. The term "prerequisites" when used in relation to a service or component of a cloud-based application refers to an ordered set of events that are performed prior to performing some specified operation related to the service or component. When the events in an ordered set associated with a component or a service have been performed, the prerequisites for that component may be satisfied and the specified operation may be performed.

The ordered set of events may include a list of events and specify a sequence for initiating execution of the events in the ordered set. For example, service S2 164-1, S3 164-2, and service S3 164-3 may be started when service S5 154 has been started. The sequence may include events in the ordered set that may be started or executed concurrently or in parallel. For example, services S2 164-1, S3 164-2, and S4 164-3 may be started in parallel, after which service S1 174 may be started. Service S1 174 may be started after its prerequisites given by the set of services S5 154, S4 164-3, S3 164-2, and S2 164-1 have all been started. If an operation on a service or component may be performed without regard to other events, then, that service or component may have no prerequisites and the ordered set may be empty.

In general, the prerequisites for a service or component may include: temporal dependencies, which are events to be completed by a time when some operation is performed on the service or component; and/or resource dependencies, which are resources to be available when the operation is performed on the service or component; and/or placement dependencies, which may specify a distribution of one or more other application components on the cloud when the operation is performed on the service or component.

For example, service dependency information may be used to specify that the starting of a first service is dependent on the starting of and/or attainment of some state (e.g. an execution state) of one or more other services. For example, service dependency information may specify that services S2 164-1, S3 164-2, and S4 164-3 may be started when service S5 154 has been started. In some instances, service dependency information for a first service may also specify that the first service cannot depend on one or more other services. For example, dependency metadata specifying that a first service cannot depend on a second service may be used during system configuration to prevent configurations where the first service depends on the second service.

As another example, residence dependency information may include VM co-residency information and/or VM placement information and/or container cluster placement information. VM co-residency information for a first component (e.g. a service or a nested application that is part of a multi-tier application) may specify information about other components that may be co-resident with the first component on a given VM or container host when deployed. In some instances, VM co-residency information for a first service may specify that the first service cannot be co-resident with one or more other specified services running on the same VM. In some embodiments, the VM placement information may specify a mapping of components to VMs. For example, VM placement information may determine how application components are distributed among available VMs. In some embodiments, VM residence dependency information associated with a service may be used to determine placement of the service at the time the service is deployed. In some embodiments, the residence dependency information may specify that a tier (e.g. services S2 164-1, S3 164-2. and S4 164-3 in tier 160) is to be deployed on a container cluster (e.g. Kubernetes).

As a further example, based on the service dependency information, some services may be started concurrently during deployment, whereas the start up of other services that depend on one or more prerequisite services may be delayed until the respective prerequisite services are running. In some embodiments, resource dependency information associated with a service may be used to determine when the service may be started. As another example, resource dependencies associated with a service may specify when the service may be started.

Resource dependency information for a service may specify resources hardware and software that the service is dependent upon. These may include, for example, security compliance parameters, (e.g. firewalling capability, identity and access management, data protection, etc.), disk input-output operations per second (IOPS), etc. Thus, for a first service with explicit service and resource dependencies, the service and resource dependencies may be satisfied prior to starting the first service.

As shown in FIG. 3A, exemplary hybrid distributed multi-tier application 100 includes three-tiers 150, 160 and 170. Service S5 154 is in a first tier 150, while services S2 164-1, S3 164-2, and S4 164-3 are in a second tier 160, and service S1 174 is in a third tier 170. Typically, for a multi-tier application if services with no dependencies are considered as being in Tier 1, then one or more services in Tier i for i>1 may depend on services in Tier (i−1). A tier i may include one or more services some of which may be dependent on an immediately lower tier. Tiers may be scalable. Scalability refers to the property by which a tier i (which may be viewed as a cluster of services termed a service cluster) can be instantiated and run concurrently in multiple VMs/container hosts.

Further, as shown in FIG. 3A, services S2 164-1, S3 164-2, and S4 164-3 depend on service S5 154, while service S1 174 depends on services S2 164-1, S3 164-2, and S4 164-3. Therefore, based on the dependency information, an execution sequence for services S1-S5 may be determined. Accordingly, execution of S2 164-1, S3 164-2, and S4 164-3 may be initiated after execution of S5 154 has been initiated, and execution of S1 174 may commence after execution of S2 164-1, S3 164-2, and S4 164-3 has been initiated.

Multi-tier cloud based applications are used widely in a variety of areas including e-Commerce, Business-to-Business, Banking and Financial, Retail and Social Networking etc. Each application/class of applications may have different deployment configurations with web servers, application servers and database servers.

Typically, most enterprise multi-tier applications are composed or built from a set of common underlying services. For example, a typical multi-tier web application may include one or more of: front-end cache or web accelerator services (e.g. Varnish etc.) to speed up access to web content; load balancing services (e.g. Nginx ("engine-X"), HAProxy etc.), which may distribute workloads between VMs used by the multi-tier application; application server services (e.g. Tomcat, Jetty, Jboss, Weblogic, Websphere etc), which may serve web pages to end users including web pages that include Java-based web content such as servlets; relational database services (e.g. MySQL, MS SQL Server, Oracle, DB2 etc.), which use Structured Query Language (SQL) to access and manage relational database content; non-relational (or so-called "NoSQL") database services (e.g. Cassandra, Mongo DB etc.), which provide access to variety of non-relational distributed databases, which may include document databases, key-value stores, graph stores such as information about interrelationships between entities, etc.; distributed file systems (e.g. GlusterFS, FhGFS, Lustre etc), which may provide scalable network attached storage (NAS) and/or distribute/aggregate data to/from a plurality of storage servers into a parallel network file system; etc.

Figure 3B:
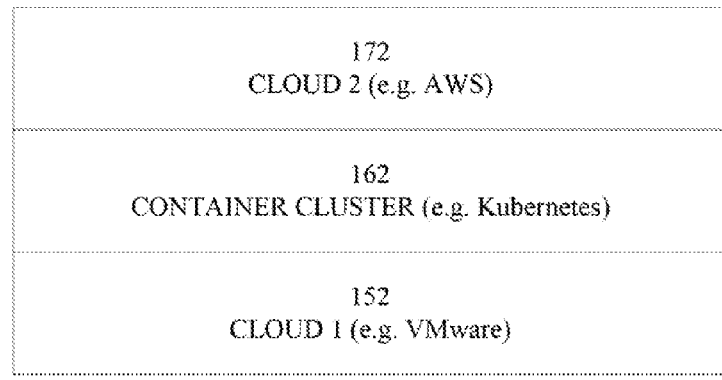
FIG. 3B illustrates a deployment configuration for an exemplary multi-tier distributed application.

FIG. 3B illustrates a deployment configuration for the multi-tier distributed application. For example, a user may specify that an infrastructure independent representation of hybrid distributed multi-tier application 100 be deployed with first tier 150 being deployed on Cloud 1 152 (e.g. a VMware private cloud); a second tier 160 being deployed on container cluster 162 (e.g. Kubernetes); and third tier 170 being deployed on a second cloud 172 (e.g. an Amazon Web Services (AWS) public cloud). In conventional systems, to deploy even separate instances of a multi-tier distributed application on distinct clouds, a user would typically code or re-code the multi-tier distributed application to facilitate the deployment of an instance on each cloud. Further, any changes to the deployment configuration would require further user-intervention and recoding on a per cloud basis. Moreover, many conventional systems do not support the deployment of hybrid distributed applications without user-intervention, recoding, and/or customizations, which are cumbersome, waste coding resources, increase user costs, and difficult to maintain. Disclosed embodiments facilitate orchestration and deployment of hybrid distributed applications such as hybrid distributed multi-tier application 100 on a plurality of clouds and/or container clusters based on an infrastructure independent representation of the hybrid (e.g. multi-tier distributed) application.

Figure 3C:
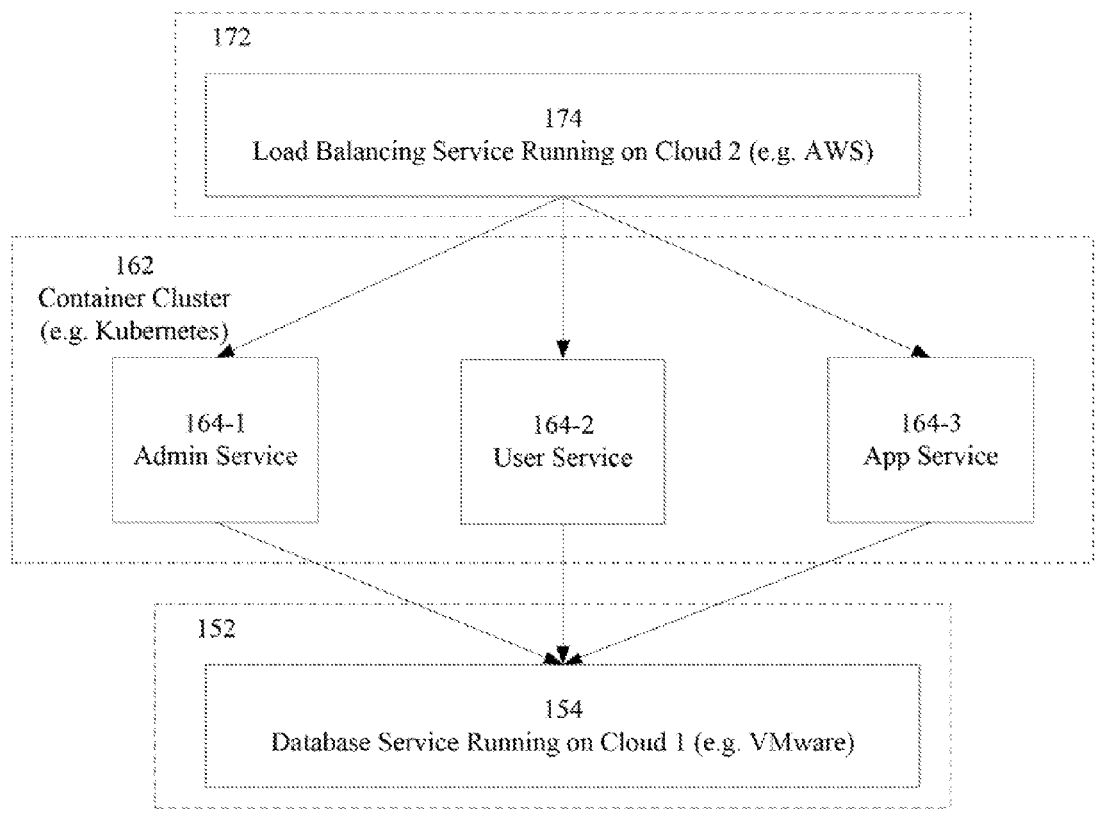
FIG. 3C illustrates an exemplary deployment of components of an exemplary multi-tier distributed application.

FIG. 3C illustrates an exemplary deployment of components of the multi-tier distributed application 100. In FIG. 3C, service S5 154 is shown as a database service deployed on a VMware private cloud. Further, services S2 164-1, S3 164-2, and S4 164-3 are shown as an Admin Service, a User Service, and an App Service, respectively. Services S2 164-1, S3 164-2, and S4 164-3 are deployed on a Kubernetes container cluster. In addition, service S1 174 is shown as a load balancing service 174 running on Amazon AWS. Thus, in FIGS. 3B and 3C the VM-based portions of hybrid multi-tier distributed application run on distinct clouds, while the container-based portions may run on a container cluster. The deployments shown in FIG. 3C is merely exemplary and, in general, various other clouds and/or container clusters may be used to deploy a multi-tier distributed application.

Figure 4A:
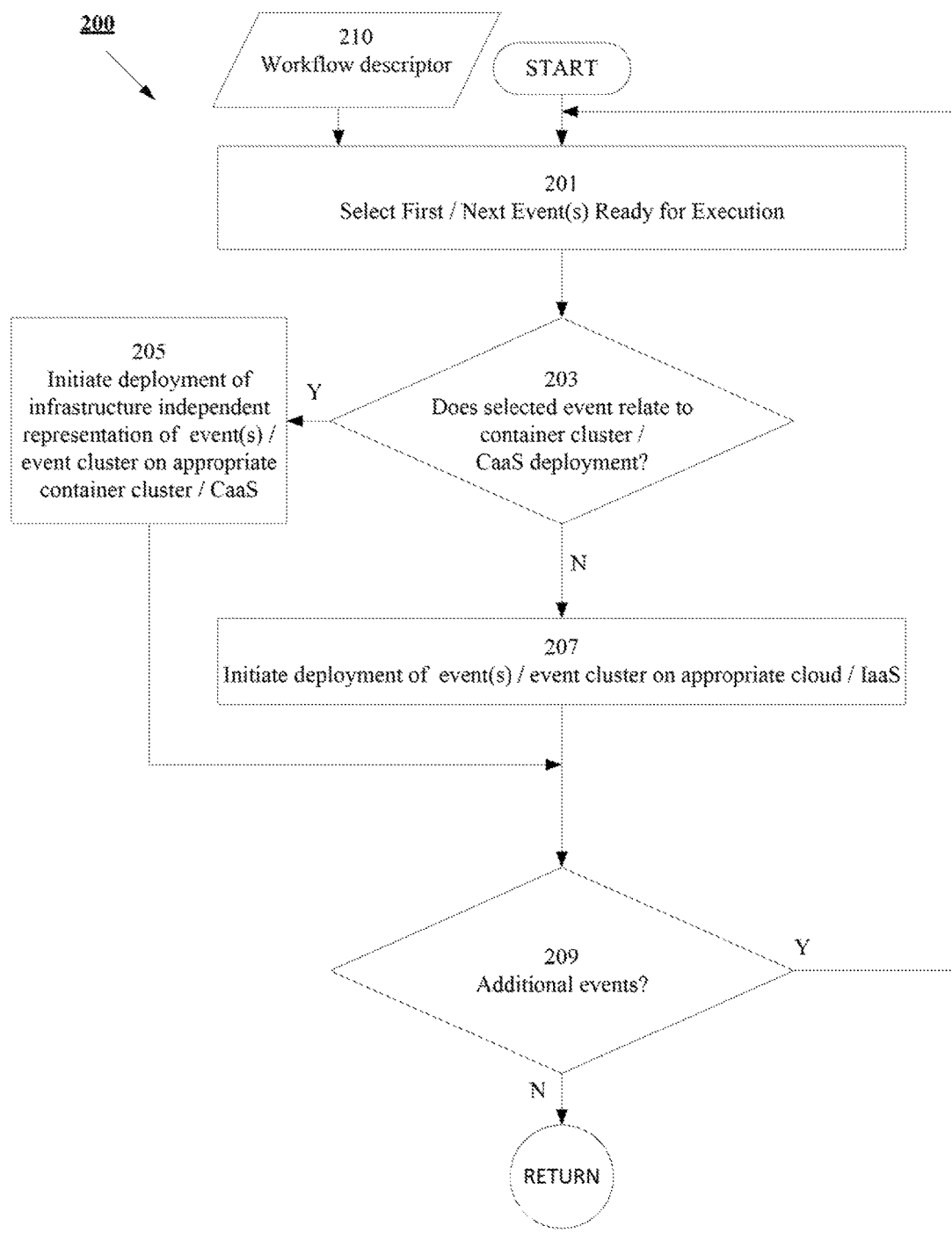
FIG. 4A shows a flowchart of an exemplary method for orchestrating and deploying cloud agnostic representations of a multi-tier distributed application over clouds and container clusters in a manner consistent with disclosed embodiments.

FIG. 4A shows a flowchart 200 of an exemplary method for orchestrating and deploying cloud agnostic representations of a hybrid multi-tier distributed application over clouds and container clusters in a manner consistent with disclosed embodiments.

In block 201, first or next event(s) that are ready for execution may be selected. For example, the events and dependencies may be specified in Workflow Descriptor 210, which may form part of an infrastructure agnostic representation of a hybrid multi-tier distributed application may be selected. For example, Workflow Descriptor 210 may include metadata about events pertaining to a hybrid multi-tier distributed application application being orchestrated and/or deployed on a cloud and/or container cluster.

Workflow Descriptor 210 may include "event clusters." Event clusters may represent some grouping of events. Workflow Descriptor 210 may specify actions related to the event cluster. For example, Workflow Descriptor 210 may include information that event cluster (e.g. services S2 164-1, S3 164-2, and S4 164-3 in application tier 160) are to be deployed on a container cluster. Workflow Descriptor 210 may specify metadata, which may indicate a specific container cluster (e.g. Kubernetes) on which the event cluster is to be deployed. Similarly, Workflow Descriptor 210 may indicate that a second event cluster (e.g. associated with second tier) is to be deployed on a first specific cloud (e.g. a VMware private cloud), while a third event cluster (e.g. associated with a third tier) is to be deployed on a second cloud distinct from the first cloud (e.g. AWS).

Event clusters may include "service clusters," which refer to a collection of distributed services, which may be deployed together. Services in the service cluster may be clustered for operational and/or functional reasons, for example, on account of business or technological commonalities. Service clusters may be viewed as an affiliation of services and a combination of their functionalities to solve a business and/or technological problem. For example, a service cluster may be deployed on a container cluster or on a VM.

In block 203, it may be determined whether the selected event(s) or event cluster (e.g. if the event is associated with an event cluster) is to be deployed on a container cluster or using a CaaS. If the selected event(s)/event cluster is ready for deployment and is to be deployed on a container cluster ("Y" in block 203), then, in block 205, a container cluster/CaaS associated with the selected event(s)/event cluster may be determined and deployment of the container-based application component or container based event(s)/event cluster (e.g. based on an infrastructure independent representation of services S2 164-1, S3 164-2, and S4 164-3 in tier 160 of hybrid distributed multi-tier application 100) may be initiated. For example, a DOE node or agent associated with the container cluster/CaaS may be used to deploy the event cluster on the container cluster. The event(s)/event cluster may be placed on an event message bus, where it may be processed by a distributed orchestration engine (DOE) node. The DOE is discussed further below in relation to FIG. 4B If the selected event(s)/event cluster is ready for deployment but is not to be deployed on a container cluster ("N" in block 203), then, in block 207, a cloud/IaaS associated with the selected event(s)/event cluster may be determined and deployment of the VM-based application component or VM-based event/event cluster (e.g. based on an infrastructure independent representation of service S1 164-1 in tier 170 of hybrid multi-tier distributed application 100) may be initiated. For example, a DOE node or agent associated with the appropriate cloud/IaaS may be used to deploy the event(s)/event cluster on the cloud/IaaS. For example, the event(s)/event cluster may be placed on an event message bus, where it may be processed by a distributed orchestration engine (DOE). The DOE is discussed further below in relation to FIG. 4B.

In some embodiments, separate event(s)/event clusters that form part of hybrid multi-tier distributed application (e.g. S1 174 and S5 154 in two different tiers—170 and 150, respectively—of the hybrid multi-tier distributed application) may be deployed on distinct clouds (e.g. AWS and VMware) based on the infrastructure independent representation of the hybrid multi-tier distributed application.

In block 209, if there are additional events to be processed ("Y" in block 209), then another iteration is commenced in block 201. If there are no additional events to be processed ("N" in block 209), then control may return to the calling routine.

Figure 4B:
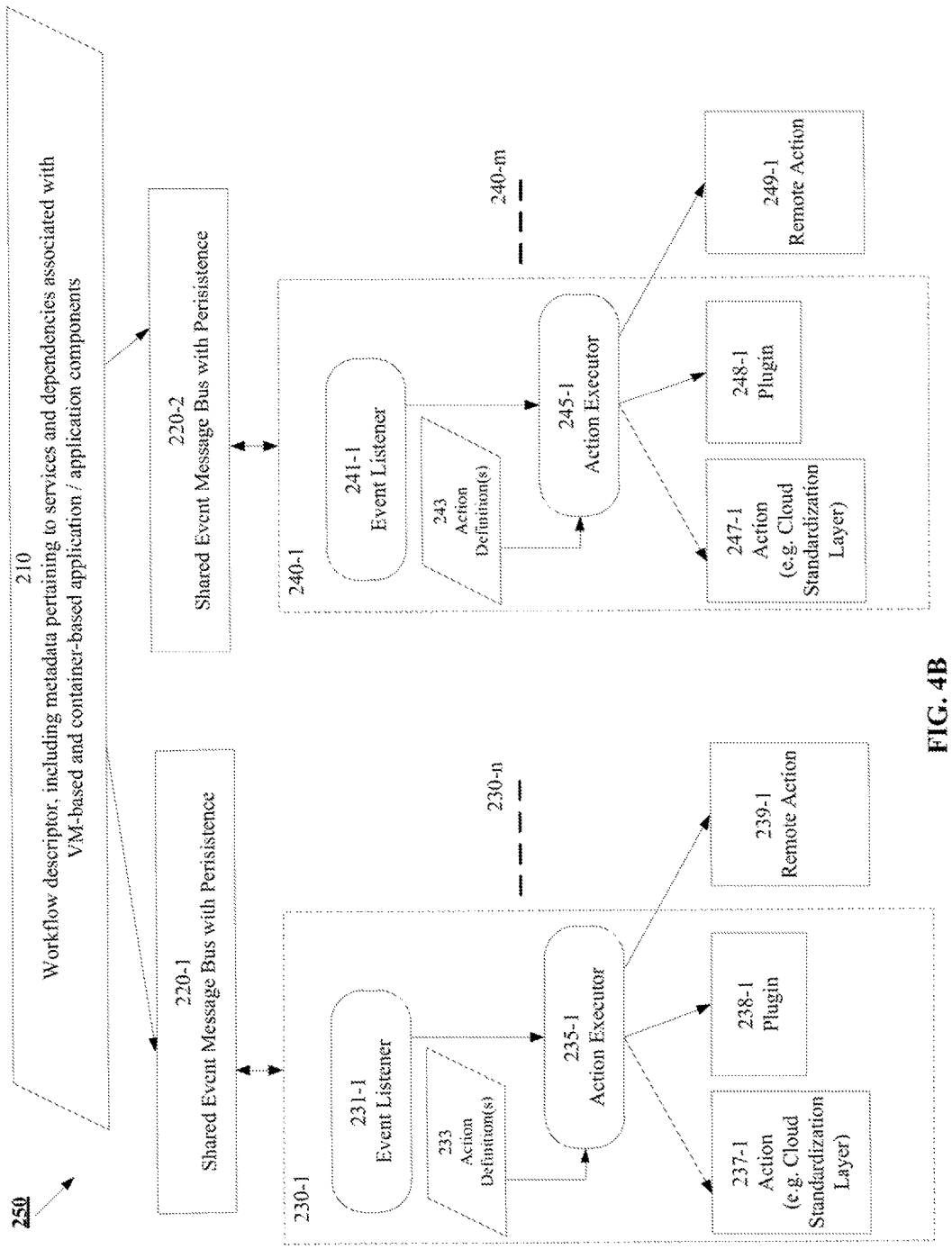
FIG. 4B shows a flow diagram illustrating the distributed orchestration of an exemplary multi-tier distributed application over a plurality of distinct clouds.

FIG. 4B shows a block diagram of an exemplary architecture for a system 250 for distributed orchestration of VM-based applications or VM-based portions of hybrid distributed applications in a manner consistent with disclosed embodiments. In some embodiments, system 250 may be used, in part, for the distributed orchestration and/or deployment of VM-based portions of hybrid distributed applications. In some embodiments, system 250 may form part of a Distributed Orchestration Engine (DOE), which may be distributed across several nodes of one or more clouds. In some embodiments, the DOE may operate on a cloud agnostic representation of the hybrid distributed computing application.

System 200 may include one or more Shared Event Message Buses with Persistence (SEMB-P) 220, where each SEMB-P 220-$k$ may be associated with a corresponding cloud k (not shown in FIG. 4B) and/or container cluster k (not shown in FIG. 4B). SEMB-P 220 may obtain or access Workflow Descriptor 210. In some embodiments, a system manager, coordinating DOE node, or another system entity may maintain coherence across multiple SEMB-Ps 220-$k$. Coherence may ensure that the various SEMB-Ps 220-$k$ correctly and consistently reflect the event state.

For example, a system manager or a coordinating DOE node may provide SEMB-P 220-$k$ with Workflow Descriptor 210 and/or a portion of Workflow Descriptor 210 for an application and/or application component related to cloud k (and/or container cluster k) on which a VM-based portion (or container-based portion) of a hybrid distributed application (e.g., hybrid distributed multi-tier application 100) is being deployed. For example, SEMB-P 220-1 may be associated with cloud 1 (e.g. VMware) while SEMB-P 220-2 may be associated with cloud 2 (e.g. AWS). Further, a system manager or another entity associated with a DOE may provide SEMB-P 220-1 with access to portions of Workflow Descriptor 210 relevant to events associated with database service 154 on cloud 1 (e.g. VMware). The system manager or other entity associated with the DOE may also provide SEMB-P 220-2 with access to portions of Workflow Descriptor 210 relevant to events associated with load balancing service 174 on cloud 2 (e.g. AWS). The system manager or other entity associated with the DOE may further ensure coherency between SEMB-P 220-1 and SEMB-P 220-2. Maintaining coherence may ensure that both SEMB-P 220-1 and SEMB-P 220-2 correctly reflect the event state (e.g. event processed, events being processed, and/or events ready for execution etc.) of system 250.

In some embodiments, Workflow Descriptor 210 may include metadata pertaining to services, dependencies, and/or lifecycle stages associated with a hybrid distributed application being orchestrated and/or deployed on one or more clouds and/or container clusters. For example, Workflow Descriptor 210 may include metadata pertaining to services and dependencies associated with one or more VM-based and/or container-based applications/application components.

In some embodiments, Workflow Descriptor 210 may be specified using an infrastructure agnostic representation. The term "persistence" when used in the context of the shared event bus refers to data on the shared event bus that is stored (e.g. in a structure such as a queue in shared memory), available (e.g. simultaneously to nodes coupled to the bus) and may be retrieved by one or more nodes. In some embodiments, an SEMB-P 220-$k$ associated with a cloud k may be used for communication and coordination between DOE nodes associated with the corresponding cloud k.

In some embodiments, Workflow Descriptor 210 may include metadata about events pertaining to a hybrid distributed application being orchestrated and/or deployed on one or more clouds and container clusters. For example, a hybrid distributed application may include components and a series of events associated with one or more of the components, where each event may be associated with one or more actions. Workflow Descriptor 210 may include a representation of an ordered set of workflows describing a sequence of steps for deploying a cloud-based application. Workflows may describe the application topology and may reflect dependencies between components of the application.

In some embodiments, the actions associated with an event may be specified using an event-action map. In some embodiments, the event-action map may be specified in an extensible format and may include a mapping of events to actions. In some instances, the actions in the event-action map may be atomic or built using atomic actions. The term "atomic" when used with "action" is used to refer to actions specified at a level of granularity where the "atomic actions" may be used as building blocks to construct more complex actions and/or re-used in other contexts. Atomic actions facilitate the reuse of actions in a variety of contexts. Actions may also include control operators such as AND, OR, PARALLEL, etc, which may determine which actions are executed (e.g. one of several; all) and how the actions are executed (sequential; in parallel). In some instances, actions may map to one or more additional events, each of which may have respective event action maps.

Further, in some embodiments, Workflow Descriptor 210 may include a "scalable" descriptor. The scalable descriptor may specify a minimum (e.g. as shown in and maximum cluster size, which may be used to bound the number of VMs/nodes/service instances/container hosts that a service runs on. For example, a minimum or maximum cluster size may be set for scalable web server service Tomcat 7. When an application with the Tomcat 7 service is launched, the Tomcat 7 service may be dynamically scaled up or down by adding or removing: VMs/the number of running instances/container hosts in a range from minimum scalable size to maximum scalable size based on various conditions. For example, the automatic scaling of services may be driven by CPU load policies, load balancer input, VM/container host availability, price-performance ratios, cost considerations, etc. In some embodiments, the information may be used to specify an appropriate scaling policy in a manner consistent with a container cluster on which a hybrid distributed application is being deployed. For example, the information may be used to set environment variables or other parameters used by cluster manager 95 (FIG. 2).

In general, a user may specify placement/residency and/or co-residency information for a subset of the plurality of components (e.g. services and/or nested applications) in a multi-tier application. The placement or residency information may specify a mapping of components of a multi-tier application to one or more virtual machines (e.g. VM-based portions of the hybrid application) or to a container cluster (e.g. container-based portions of the hybrid application) for running those components. Co-residency information may specify (i) components that may not be co-resident and/or (ii) components that are to be co-resident on a VM/node/container cluster when the hybrid distributed application is deployed. For example, metadata in Workflow Descriptor 210 may specify VM co-residency for services S2 164-1, S3 164-2, and S4 164-3 (FIG. 3) in tier 160 on a container cluster.

As another example, residency or placement dependency data for the Tomcat service may specify that Tomcat cannot co-reside with a load balancing service. The residency dependency data may be used to ensure that a single VM does not run both Tomcat and a load balancing service.

In some embodiments, the actions associated with an event may be specified in an event-action map, which may specify the actions associated with each event and/or the context or conditions under which one or more of the actions may be performed. For example, the actions associated with an event in an event-action map may be varied based, in part on whether the application is being initialized, terminated, suspended, scaled, upgraded, and/or migrated. The term "lifecycle stage" is used to refer to a stage in the configuration, deployment, or running of an application. For example, the lifecycle stage may be one of initialization, termination, suspension, scaling, upgrading, and/or migration. The life cycle stage may apply to application(s), to service clusters associated with the application(s), to services, and nodes running the services. For example, actions associated with lifecycle stage related information for a service may include: (i) locations to obtain the service for one or more clouds (e.g. specified using Uniform Resource Locators (URLs)), and/or (ii) start up, restart, initialization and/or stop scripts, (iii) migration scripts, (iv) upgrade scripts, (v) backup and/or (vi) crash recovery scripts, etc. or the locations (e.g. specified using URLs) of the respective scripts thereof.

For example, for an initialization lifecycle stage actions may include installation of software packages and specification of initialization and clean up scripts at the node level, which may be performed (e.g. by DOE/system 250) prior to service startup. As another example, during an initialization lifecycle stage, actions may include: (i) automatic downloading of executables for the various services for cloud that the multi-tier application is being deployed on; (ii) configuration of the multi-tier application and component services based on the specified properties; and (iii) starting, in a sequence conforming to specified dependencies in Workflow Descriptor 210, component services of the multi-tier application.

In some embodiments, an entry point event, which may be associated with one or more additional events, may be used to signal that prerequisites for the launch of the one or more additional events have been satisfied. When the prerequisites for the launch of the one or more additional events have been satisfied (which may be indicated by the entry point event), the one or more additional events may be launched.

Thus, in some embodiments, Workflow Descriptor 210 may be viewed as an ordered set of events associated with a cloud-based application where each event may be associated with a set of event-action maps, where each event-action map in the set may be associated with a distinct lifecycle stage.

In general, at an application level, Workflow Descriptor 210 may facilitate representation of lifecycle stage attributes for event-action map storage and persistence, and attributes supporting listener capabilities for event observers. For example, for a hybrid distributed multi-tier application such as exemplary hybrid distributed multi-tier application 100, Workflow Descriptor 210 may specify events at the application level. The events at the application level may be associated with a first event-action map. For example, referring to FIG. 1, a first event-action map may point to services S1 154, S2 164-1, S3 164-2, S4 164-3, and S5 174. Further, in the example above, a second event action map, which may be associated with one or more of S2 164-1, S3 164-2 and S4 164-3 may have a pointer to a service cluster given by S2 164-1, S3 164-2 and S4 164-3.

In general, one or more tiers (e.g. 150, 160, or 170) within a distributed application may be associated with an event cluster. For example, the event action map associated with a service cluster may specify dependencies related to the cluster (at some lifecycle stage of the cluster). For example, when a service cluster is initialized (e.g. lifecycle stage=initialization), dependent service clusters may be notified of the initialization using appropriate entry point events. In addition, a third event action map associated with an event cluster (e.g. service cluster S2 164-1, S3 164-2 and S4 164-3) may include pointers to additional services associated with the cluster. A fourth event action map associated with one of the additional services may have pointers to one or more nodes (e.g. when services S2 164-1, S3 164-2 and S4 164-3 are VM-based). A fifth event action map associated with the one of the nodes may serve, at least in part, to define a VM running the service. Thus, event action maps for a multi-tier application may form a hierarchy. The event action maps at each level of the hierarchy may have pointers to other event action maps. The specific event action map invoked may depend on a current lifecycle stage of the invoking component. Thus, as one example, for a VM-based application, an application lifecycle, which may have multiple lifecycle stages, may be viewed as comprising one or more cluster lifecycles. The cluster lifecycle may be viewed as comprising one or more service lifecycles. The service lifecycles, in turn, may comprise one or more node lifecycles.

In some embodiments, events in Workflow Descriptor 210 may be placed on SEMB-P 220. For example, the events may be placed in a queue or another ordered list. In some embodiments, SEMB-P 220 may be implemented using a variety of shared message buses supporting persistence. In general, any message queue based protocol over a message bus may be used to implement SEMB-P 220. For example, in one implementation, MongoDB, which provides file system functionality and supports data replication across nodes, may be used to implement SEMB-P 220. In some embodiments, one or more events may be placed on SEMB-P 220 when the events are ready for execution. The term "ready for execution" indicates satisfaction of prerequisites for execution of the event.

System 200 may include distributed nodes 230-1 through 230-n, which may be coupled to SEMB-P 220-1; and distributed nodes 240-1 through 240-m, which may be coupled to SEMB-P 220-2. As outlined above, SEMB-P 210-1 may be associated with first cloud (e.g. Cloud 1 152), while SEMB-P 210-2 may be associated with a second distinct cloud (e.g. Cloud 2 172). In some embodiments, nodes 230-1-230-n and 240-1-240-n may be part of a DOE. In some embodiments, exemplary DOE node 230-i may include Event Listener 231-i and Action Executor 235-i, for 1≤i≤n; and DOE node 240-j may include Event Listener 241-j and Action Executor 235-j, for 1≤j≤n. For simplicity and ease of description, the operation of nodes 230 and 240 has been described below using DOE node 230-1 as an example. The other DOE nodes may operate in a similar fashion.

In some embodiments, Event Listener 231-1 may listen on SEMB-P 220-1 to monitor the event queue for an indication of one or more events that are ready for execution. Upon receiving an indication that one or more events are ready for execution, DOE node 230-1 may select an event at the top or head of event message queue for further processing. In some embodiments, after selecting an event, DOE node 230-1 may remove the event from the top of the event message queue and/or place a message on SEMB-P 220-1 indicating that the event is being processed. In some embodiments, SEMB-P 220-1 may be locked by DOE node 230-1 during selection to prevent conflicts and race conditions with other DOE nodes. In some embodiments, a priority scheme, round-robin approaches, load balancing criteria etc. may be used in a distributed fashion by nodes to autonomously determine whether they may select an event for further processing. For example, each DOE node 230-*i* may use some user-specified or system criteria related to its current or predicted workload etc to determine when to select an event for processing.

In some embodiments, metadata pertaining to the selected event in Workflow Descriptor 210 may be passed to Action Executor 235-1. Action Executor 235-1 may look up Action Definition 233 to determine an action associated with the event being processed. In some embodiments, the action may be based, in part, on the lifecycle stage associated with the event being processed. Based on the action information, Action Executor 235-1 may execute the action locally or remotely. In some embodiments, events associated with Workflow Descriptor 210 may be used to orchestrate an application through various stages of the application lifecycle.

As one example, a "stop application" event may be used, for example by DOE, when termination of an application is desired. In some embodiments, metadata related to the example "stop application" event may be obtained from Workflow Descriptor 210, placed on SEMB-P 220-1, and may be selected for further processing.

For example, referring to FIG. 4B, Event listener 231-*i* on an available node 230-*i* (e.g. a relatively lightly loaded node or the next node in turn) may detect the presence of "stop application" event on SEMB-P 220-1 at the top of the event queue and may select "stop application" event for further processing.

Next, the selection of the stop application event for processing may be indicated, for example, by removing the message from the top of the event message queue. For example, after selecting the stop application event, Event listener 231-*i*/DOE node 230-*i* may remove the event from the top of the event message queue and/or place a message on SEMB-P 220-1 indicating that the event is being processed. As outlined above, event listeners 231 may listen on SEMB-P 220-1 and select events from the top of event queue, which may then be acted upon by a corresponding Action Executor 235. For simplicity and ease of description, actions of event listeners 231 have been omitted in the discussion below.

Based, in part, on the current lifecycle stage of the application, one or more actions associated with the Stop Application event may be obtained from an event-action map associated with the application and/or event. For example, if the cloud-based application is not in a "running," "started," or other valid state, an error may be indicated and an appropriate error handler may be invoked or a message/event may be placed on SEMB-P 220-1.

In some embodiments, an event-action map associated with the application, which may include action definitions associated with events and corresponding to a current lifecycle stage of the application, may be available and/or, may have been made available to one or more nodes 230-*i* and/or 240-*j* (i) at the time the application was deployed; or (ii) at the time the application changed state—such as transitioning from one lifecycle stage to another. Continuing with the example above, a lifecycle/current lifecycle stage associated with the application to which "stop application" event is being applied may then be obtained, if not previously available to the DOE.

In instances, where the application comprises one or more service clusters and the application is in a valid lifecycle stage, the "stop application" event may resolve to a "stop cluster" event, which may be triggered on the service clusters associated with the application.

Next, in the example above, the current lifecycle stage of each service cluster associated with the application may be determined. For example, the "stop cluster" event may be applicable to service clusters associated with the application, which are in a "running" lifecycle stage. If a service cluster associated with the application is not in the "running" lifecycle stage, then the "stop cluster" event may not be applied to that service cluster. Accordingly, in some embodiments, for service clusters associated with the application, which are in the "running" lifecycle stage, an Action Executor 235 may resolve the "stop cluster" event to an action such as, for example, "lifecycle_action_cluster_stop" obtained from a corresponding Action Definition 233.

The "lifecycle_action_cluster_stop" action, in turn, may lead to the invocation (e.g. by the DOE) of cloud-specific (or container-cluster specific) operations leading to termination of each of the nodes corresponding to the service cluster associated with the application. For example, the operations may include a "terminate node" event for each node to be terminated, which may be placed on SEMB-P 220-1.

Further, in the example above, Action Executor(s) 235 corresponding to DOE node(s) 230 may resolve the "terminate node" event to a corresponding action, such as, for example, a "lifecycle_action_node_terminate" action, which may terminate the node and place a "node stopped" event on SEMB-P 220-1. Further, "lifecycle_action_node_terminate" action may cause a "stop service" event to be placed on SEMB-P 220-1.

In the example above, "stop service" event may resolve to a "lifecycle_cluster_state_change_wait" action, which may wait until all the nodes (and hence services) associated with the cluster have been terminated. When all the services are terminated, a "service stopped" event may be placed on the SEMB-P 220-1.

The "service stopped" event, which may be processed based on the event-action map associated with the service cluster, may resolve two actions executed sequentially: (i) "lifecycle_action_evict_storage_cache," which clears the cache, and (ii) "lifecycle_action_common_send_status_update", which waits till all the service clusters associated with the application have been terminated, and places a "cluster stopped" event on SEMB-P 220-1.

The "cluster stopped" event, which may be processed based on the event-action map associated with the application and result in the termination of the application by invocation of the appropriate actions. When the application has been terminated, a "stopped application" event may be placed on SEMB-P 220-1 indicating that the application in the example above has been terminated.

In some embodiments, the execution of actions may occur in parallel (unless specified otherwise) and in some instances, may not be dependent on the state of other nodes executing the actions. For example, for the "terminate node" event may trigger the "node stopped" and "service stopped" events, and actions corresponding to the "node stopped" and "service stopped" events may be executed on the appropriate nodes in parallel without regard to the state of the other nodes in the service cluster. However, coordination of actions at a higher level in the hierarchy may continue to occur. For example, as outlined above, the "lifecycle_cluster_state_change_wait" action may wait until all the nodes associated with the service cluster have been terminated.

In some embodiments, based, in part, on the action specified in Action Definition 233, Action Executor 235-1 may invoke Action 237-1 on the cloud associated with the node. For example, when Action Definition 233 is specified in an infrastructure agnostic fashion, then, Action 237-1 may invoke a Cloud Standardization Layer associated with the cloud to execute the action through a script/program and/or to provision or configure cloud resource on the cloud.

In some embodiments, Action Executor 235-1 may initiate the execution of the script (e.g. through a Cloud Standardization Layer for a VM-based application) using a secure container based sandbox. A sandbox refers to a security mechanism for separating running programs. Secure container based sandboxes provide resources to efficiently run programs/scripts without instantiation of an entire VM.

In some embodiments, where new endpoint based services such as PaaS or CaaS are being added, VMs may not be launched for service endpoints when a hybrid distributed application that includes the endpoint-based service is deployed. For example, for a multi-tier hybrid distributed application with an external service endpoint, which may be provided in the form of a CaaS (e.g. Kubernetes), Action Executor 235-1 may invoke a container-cluster specific plugin to interface with the CaaS endpoint based service, deploy the service cluster (e.g. services S2 164-1, S3 164-2 and S4 164-3 on container cluster 162), and make any configuration changes (e.g. to facilitate service discovery and communication of the deployed container-based applications with VMs (e.g. on cloud 1 152 and cloud 2 172).

As another example, for a multi-tier hybrid distributed application with an external service endpoint, (e.g. such as Amazon RDS), which may be provided in the form of a PaaS, no VMs may be launched when the multi-tier application that includes the endpoint based service is deployed. Action Executor 235-1 may invoke a cloud-specific plugin to interface with the endpoint based service. As one example, plugins may be used for logging events, obtaining metrics, log management, etc. As another specific example, off the shelf services to perform one or more functions (e.g. "Sumo Logic") may be integrated into an event-action framework. For example, "Sumo Logic", which is an off the shelf service for cloud-based log management and analytics, may be integrated into the event-action framework using an associated Java archive ("jar") file that may be resident on the node. Events from the event-action framework may be mapped to functions and/or actions in the "sumo logic" application based, in part, on the contents of the jar file.

In some embodiments, Action Executor 235-1 may initiate the remote execution of an action in a VM through an agent in the VM or container cluster. For example, Action Executor 235-1 may communicate securely with a management agent in the VM or in the container cluster to remotely execute a script.

Although the description above was with reference to node 230-1, it should be understood that description may also be applicable to one or more other DOE nodes 230 or 240 in system 200. For example, DOE node 240-$m$ may process events in a manner similar to node 230-1 using Event Listener 241-$m$ and Action Executor 235-$m$, which may initiate execution of one of Action 237-$m$, Plugin 238-$m$, or Remote Action 239.

In some embodiments, when a hybrid application includes layers to be deployed on distinct clouds, a system manager or another entity associated with the DOE may determine that an event or event cluster is associated with another cloud. For example, if an event or event cluster is associated with cloud 2 172, System manager or another entity associated with the DOE may place the event or event cluster on SEMB-P 220-2, which may be associated with cloud 2 172. The event or event cluster may then be processed by DOE component associated with cloud 2 172. Upon completion of the event or event cluster, the system manager or another entity associated with the DOE may retrieve the completion message or completion from SEMB-P 220-2, and generate a corresponding message or completion event to report completion of the event on SEMB-P 210-1. Thus, the DOE may facilitate orchestration across multiple distinct clouds and container clusters.

Figure 5:
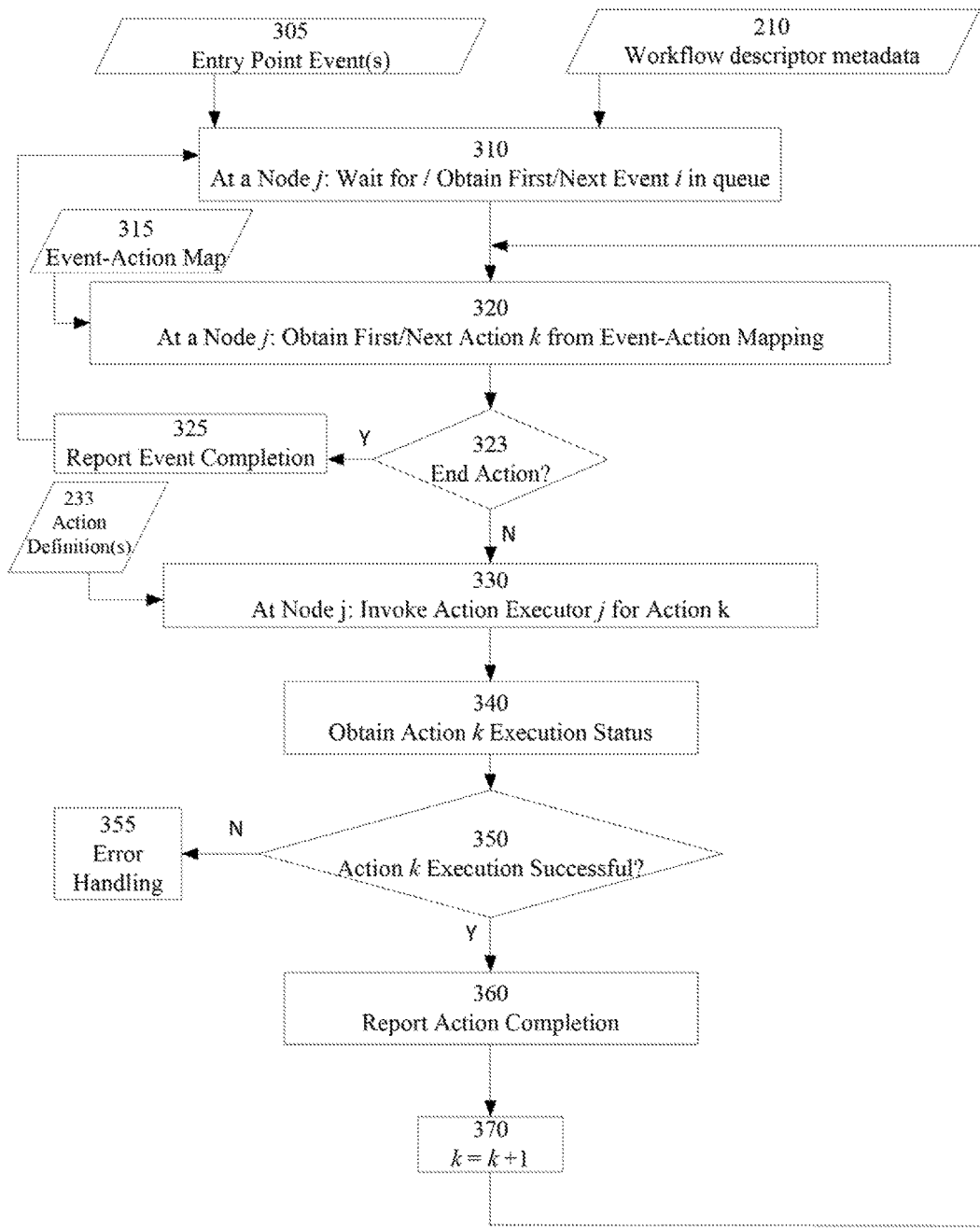
FIG. 5 shows a flowchart of an exemplary method for distributed orchestration of a cloud based application, as performed by a single node in a DOE that includes a plurality of nodes, in a manner consistent with disclosed embodiments.

FIG. 5 shows a flowchart of an exemplary method 300 for distributed orchestration of a cloud based application, as performed by a single node in a DOE that includes a plurality of nodes, in a manner consistent with disclosed embodiments. Method 300 may be also executed for other events associated with the cloud-based application by other nodes in the DOE.

In some embodiments, for a hybrid distributed application, DOE nodes 230-$j$ ($1 \leq j \leq n$) may execute method 300 for distinct events in an event message queue associated with SEMB-P 220-1 (associated with cloud 1 152), while DOE nodes 240-$l$ ($1 \leq l \leq m$) may execute method 300 for distinct events in an event message queue associated with SEMB-P 220-2 (associated with cloud 2 172) in parallel. In some embodiments, a system manager or another entity associated with the DOE may monitor event/completions and use an infrastructure independent representation of hybrid distributed application to determine a cloud p associated with a ready to execute event/event cluster, and then place the event/event cluster in an event message queue associated with the appropriate SEMB-P 220-$p$ bus. A DOE node associated with SEMB-P 220-$p$ bus may process the event and report status back to the system manager (or the appropriate DOE entity). In some embodiments, the system manager (or the appropriate DOE entity) may then report the completion of the event on another SEMB-P 200-$q$ bus (p≠q), when appropriate (e.g. when completion of the event on SEMB-P 200-$p$ bus is a prerequisite for one or more events on a distinct cloud q).

In some embodiments, a DOE node may take the form of an agent on an end-point based service (e.g. .CaaS or PaaS), and may execute appropriate scripts, configure DNS components, set, publish, and/or export environment variables (e.g. IP addresses of services), or other perform other actions to facilitate deployment of an infrastructure independent representation of the hybrid distributed application on the end-point based service (e.g. CaaS or PaaS). For example, a user may specify (e.g. using environment variables or files or in another manner) that a portion (e.g. a service cluster) of an infrastructure independent representation is to be deployed on a container cluster or CaaS, and a DOE node or agent associated with the container cluster/CaaS may execute appropriate scripts, configure a container cluster manager, DNS components, load balancer for the container cluster/CaaS etc. to ensure that appropriate deployment of the portion (e.g. the service cluster) of the infrastructure independent representation of the hybrid distributed application. In some embodiments, method 300 may be performed by a plurality of processors in a cloud based virtualized environment.

In block 310, at a DOE Node j, the first or next event i at the top of event message queue may be obtained or selected. For example, based, in part, on an infrastructure independent representation of a hybrid distributed computing application, which may include a plurality of components, an ordered set of events may be obtained based on an execution sequence for the plurality of components. Each event in the ordered set may be associated with a corresponding set of prerequisites for initiating execution of the event. An event from the ordered set may be at the head of the event message queue on SEMB-P 220-1 (e.g., when SEMB-P 220-1 is associated with DOE Node j) when prerequisites in a corresponding set of prerequisites for initiating execution of the event have been satisfied. For example, based on Workflow Descriptor 210 and an entry point event 305, DOE Node j may receive an indication and/or determine that prerequisites for initiating execution of the event i (which may at the top of the event message queue) have been satisfied.

In some embodiments, Workflow Descriptor 210 may include metadata pertaining to services, dependencies, and/or lifecycle stages associated with a hybrid distributed application being orchestrated and/or deployed. For example, the lifecycle stages may be one of: startup, shutdown, scaling, migration, backup, upgrade, or recovery. In some embodiments, the ordered set of events and the set of prerequisites for initiating execution of an event may be obtained based, in part, on a lifecycle stage associated with components of the cloud based distributed computing application. In some embodiments, Workflow Descriptor 210 may be specified using an infrastructure agnostic representation of the hybrid distributed computing application.

For example, in some embodiments, in block 310, dependency information in Workflow Descriptor 210 and/or Entry Point event 405 may be used to determine that the event i at the top of event message queue is ready to be processed. In some embodiments, Workflow Descriptor 210 may include one or more of: application topology metadata for the cloud-based distributed computing application including dependency metadata for a plurality of components of the cloud-based distributed computing application; configuration metadata for the plurality of components of the cloud-based distributed computing application; or lifecycle stage metadata for components of the cloud-based distributed computing application.

In some embodiments, upon selecting event i ready for execution, DOE Node j may provide an indication of the selection of event i. For example, an event identifier corresponding to the selected event i ready for execution may be appropriately marked, which may provide an indication that the event associated with the marked event identifier is unavailable for selection by another DOE node.

In some embodiments, the selection of the event ready for execution may be performed by DOE node j, based, at least in part, on the current workload of the DOE node j relative to the workload of some subset of nodes in the plurality of distributed nodes that comprise the DOE. In some embodiments, such as when an event pertains to an endpoint-based service, a DOE node is associated with the endpoint based service may recognize and process the event.

In block 320, based on information in event-action map 315, the first or next action k corresponding to the event i may be obtained by DOE Node j. In some embodiments, the event-action map 315 obtained may be based, in part, on a current lifecycle stage associated with the cloud-based application/event.

In some embodiments, a DOE node may take the form of an agent on an end-point based service (e.g. .CaaS or PaaS), and the actions specified in the event-action map may include the execution appropriate scripts, configure DNS components, set, publish, and/or export environment variables (e.g. IP addresses of services), or other perform other actions to facilitate deployment of an infrastructure independent representation of the hybrid distributed application on the end-point based service (e.g. CaaS or PaaS). For example, the DOE node or agent associated with the container cluster/CaaS may execute appropriate scripts, configure a container cluster manager, DNS components, load balancer for the container cluster/CaaS, set scalability parameters, etc. to ensure that appropriate deployment of the portion (e.g. the service cluster) of the infrastructure independent representation of the hybrid distributed application.

In some embodiments, in block 323, action k is checked to see whether it is an "end" action. An "end" action may be used to signal the end of an action sequence. In some embodiments, if action k is an end action ("Y" in block 323), then, in block 325, the completion of event i associated with the action sequence is reported and the method returns to block 310 where the next event is awaited. In some embodiments, a message or reporting event may be placed on event message bus to inform other DOE nodes of completion of event i. In some embodiments, upon receiving an indication of completion of one or more executed events on SEMB-P 220, one or more additional events that are ready for execution may be determined based on the received indication of completion of the one or more executed events. For example, the completion of an event may result in prerequisites associated with one or more other events to be satisfied thereby transitioning the one or more other events to a "ready for execution" state.

If action k is not an end action ("N" in block 323), then, in block 330 Action Executor j on DOE node j may be invoked. In block 330, Action Executor j on DOE Node j may be used to initiate the execution of an action associated with the event i. In some embodiments, the action to be executed may be obtained, based in part, on information in event action map 315. In some embodiments, the action may be executed using a Cloud Standardization Layer associated with the cloud; using a plugin; through a secure container based sandbox; using a DOE node/agent on an endpoint-based service, which may execute scripts and take other actions to interface with and configure the endpoint based service, directly invoking functionality provided by an off-the-shelf service, and/or remotely by secure communication with an agent on the cloud.

In block 340, the execution status of action k may be obtained. In block 350, the execution status of action k obtained in block 340 may be used to determine if action k completed successfully. If action k completed successfully ("Y" in block 350), then, in block 360, the completion of the action k may be reported. In some embodiments, a message or reporting event may be placed on event message bus to inform other DOE nodes of completion of action k associated with event i. In block 370, k may be incremented and the method returns to block 320 to process the next action associated with event i.

If action k did not complete successfully ("N" in block 350), then, in block 355, Error Handling may be performed. Error Handling routine 355 may specify corrective actions (which may, in some instances, form part of action k), or may terminate action k and report the failure appropriately (e.g. by placing an event message on the event message bus). For example, in some embodiments, action k and other actions associated with event i may be rolled back and event i may be marked as available and placed back as an active to be processed event on the event message bus. In some embodiments, the use of "atomic" events may simplify rollback by limiting the complexity of events.

Method 300 is merely exemplary and illustrative and various modifications are envisaged as would be apparent to one of ordinary skill in the art. In general, method 300 may be performed by one or more DOE nodes. In some embodiments, one or more actions in an event-action map 315 may generate one or more additional events, which may be placed on SEMB-P 220 and processed by one or more DOE nodes in a manner similar to the description above.

In some embodiments, Workflow Descriptor 210 may be described in an infrastructure agnostic manner and cloud specific implementations of various actions may be obtained using one or more of: a cloud standardization layer associated with the cloud; using a plugin; through a secure container based sandbox; using a DOE node/agent on an endpoint-based service, which may execute scripts and take other actions to interface with and configure the endpoint based service, directly invoking functionality provided by an off-the-shelf service, and/or remotely by secure communication with an agent on the cloud.

In some embodiments, method 300 may be used to facilitate the distributed orchestration and deployment of hybrid distributed applications including hybrid multi-tier applications based on an infrastructure independent representation of the hybrid distributed application. For example, Workflow Descriptor 210 may describe dependencies and other metadata based on or obtained from an infrastructure independent representation of the hybrid distributed application (e.g., a hybrid multi-tier distributed application). In some embodiments, in part, because of: the absence of: (a) cloud specific information, and/or (b) information specific to particular endpoint-based services (e.g. a CaaS and/or a PaaS), and/or (c) information specific to particular container clusters in the infrastructure agnostic representation of the hybrid distributed application, the DOE may be used to orchestrate and deploy the hybrid distributed application seamlessly on a plurality of distinct clouds and/or endpoint based services and/or container clusters. Thus, the need for expensive resource intensive cloud application orchestration and deployment is obviated.

The term "infrastructure agnostic representation" is also used to refer to a representation of an application that does not include parameters, instructions or other information that are specific to any one cloud, and/or endpoint based service and/or container cluster. Because infrastructure agnostic representations do not include information that is cloud, endpoint-based service or container cluster provider dependent, in some embodiments, the infrastructure agnostic representation of a distributed application may be deployed on: (a) on a single cloud or container cluster; (b) across a plurality of distinct clouds (cross-cloud deployment); and (c) across a plurality of plurality of distinct clouds and container clusters in a manner consistent with embodiments disclosed herein.

For example, one tier (e.g. tier 150) of an infrastructure independent representation of a hybrid distributed multi-tier application may be deployed on a first cloud (e.g. cloud 1 152 such as VMware, or a private cloud), while a second tier (e.g. tier 160) may be deployed on a container cluster/CaaS (e.g. container cluster/CaaS 162 such as Kubernetes), and a third tier (e.g. tier 170) may be deployed on a second cloud (e.g. cloud 2 172 such as AWS, or a public cloud). For example, in contrast to conventional distributed applications, which may: (i) be designed to run on a specific cloud or container cluster using cloud specific/container cluster specific orchestration; and/or (ii) require labor intensive and expensive modifications to the program code prior to orchestration and/or deployment on another cloud/container cluster; and/or (iii) where a single application cannot be deployed easily across a plurality of distinct clouds, container clusters, endpoint-based services; the infrastructure agnostic representation may be seamlessly deployed to a plurality of clouds, container clusters and endpoint based services.

In some embodiments, an infrastructure agnostic representation of a hybrid distributed application (e.g. a hybrid multi-tier application) may include infrastructure agnostic Workflow Descriptors 210 in the form of metadata. The infrastructure-independent or infrastructure-agnostic metadata may be obtained based, in part, on the infrastructure-agnostic application metadata 237 and/or from a user-specified infrastructure agnostic application profile. When the infrastructure independent representation of the hybrid distributed application is deployed to specific cloud(s), container-cluster(s), or endpoint-based service(s), the infrastructure-agnostic application metadata may be used to obtain appropriate configuration, orchestration, deployment, and/or runtime parameters that facilitate deployment of the hybrid distributed application on the specific cloud(s), container-cluster(s), or endpoint-based service(s).

Workflow Descriptor 210 may also include application metadata (which may be at an application level) for a hybrid distributed application. A hybrid distributed application may be composed of a plurality of components. In some embodiments, the application level metadata may include global information about the application as a whole, such as dependency metadata between application components and configuration information for the application/application components. In some embodiments, the application level metadata may include information about lifecycle stages, including startup, shutdown, scaling, migration, backup, upgrade etc. In some embodiments, Application metadata may include information/scripts for orchestrating an application, a preferred hardware configuration for the application, etc. In general, application metadata may include pointers to some or all of the underlying metadata associated with components of a multi-tier application being modeled.

For example, during an application migration lifecycle stage, DOE/system 200 may be used to migrate an application from a first cloud to a second cloud. The application may be migrated: (i) live, if the application supports simultaneous multi-cloud provisioning, or (ii) during application downtimes. For example, the event-action map for the application in the migration lifecycle stage may include: (i) a shutdown event and (ii) a backup event to a storage repository on the cloud running the application. Upon completion of the shutdown and backup, a DOE node on the source cloud may then initiate (iii) a file-sync event, which may move the backup to a storage repository on the target cloud. Upon completion of the file sync event, a DOE node on the source cloud may communicate with a DOE node on the target cloud to initiate orchestration using a restore lifecycle stage. The DOE node on the target cloud may then deploy the application based on events and event action maps associated with the application for the restore lifecycle stage. Thus, DOE nodes associated with the orchestration of an application on one cloud may remotely communicate securely with a DOE node associated with the application on another cloud to perform/coordinate orchestration tasks. Applications may be migrated, for example, as part of a planned migration to another cloud, because of cloud pricing, performance, cloud availability and/or for other reasons. In some embodiments, because of the cloud agnostic representation of the cloud-based application, the application may be seamlessly migrated after execution of any specified migration related scripts.

Service configuration metadata in Workflow Descriptors 210 may include generic information about a service such as name, version, service type, capabilities, service parameters etc. For example, for a Tomcat service, the generic information may include the service name "Tomcat," version "6.0," service type "Java Web Server," etc. Service configuration metadata information for a service may also include Virtual Machine co-residency information for the service and dependency rules specific to the service. For example, dependency data for the Tomcat service above may specify that it depends on one or more of a database service, frontend and/or backend cache service etc. Further, the dependency metadata may specify that Tomcat cannot co-reside (e.g. on a VM) with a load balancing service.

In some embodiments, the service configuration metadata associated with a service may include information about the service such as configuration information and service lifecycle stage attributes (e.g. startup, shutdown, scaling, migration, backup, upgrade, restore etc). Each lifecycle stage may be associated with specific information/scripts/actions for the service, a preferred hardware configuration, etc. For example, lifecycle stage service configuration metadata may specify service lifecycle related information such as one or more locations to: (i) obtain the service for one or more clouds, (ii) obtain start up, restart, initialization and/or stop scripts, (iii) migration scripts, (iv) upgrade scripts, (v) backup and/or (vi) crash recovery scripts, etc. In some embodiments, the locations may be specified using Uniform Resource Locators (URLs).

Service configuration metadata in Workflow Descriptor 210 may specify placement/residency and/or co-residency information for a subset of the plurality of components, services, and/or applications in a multi-tier application. The placement or residency information may specify a mapping of components of a multi-tier application to one or more virtual machines for running those components. Co-residency information may specify (i) components that may not be co-resident and/or (ii) components that are to be co-resident on a VM/node or a container cluster/container host when the multi-tier application is deployed.

In some embodiments, the infrastructure agnostic representation of multi-tier application may include a representation of application metadata 237 and/or system and pattern primitives, which describe the execution pattern and dependencies. In some embodiments, using events and event-action maps obtained from a single cloud agnostic representation of the hybrid distributed application (e.g. multi-tier application) may be orchestrated and deployed on one or more distinct clouds, and/or container clusters, and/or endpoint-based services. The system and pattern primitives that may be used to derive the infrastructure independent representation of the hybrid distributed application are further described in U.S. patent application Ser. No. 13/024,302 (now U.S. Pat. No. 8,862,933) entitled "Apparatus, Systems, and Methods for Deployment and Management of Distributed Computing Systems and Applications," filed Feb. 9, 2011, which is incorporated by reference herein in its entirety.

Figure 6:
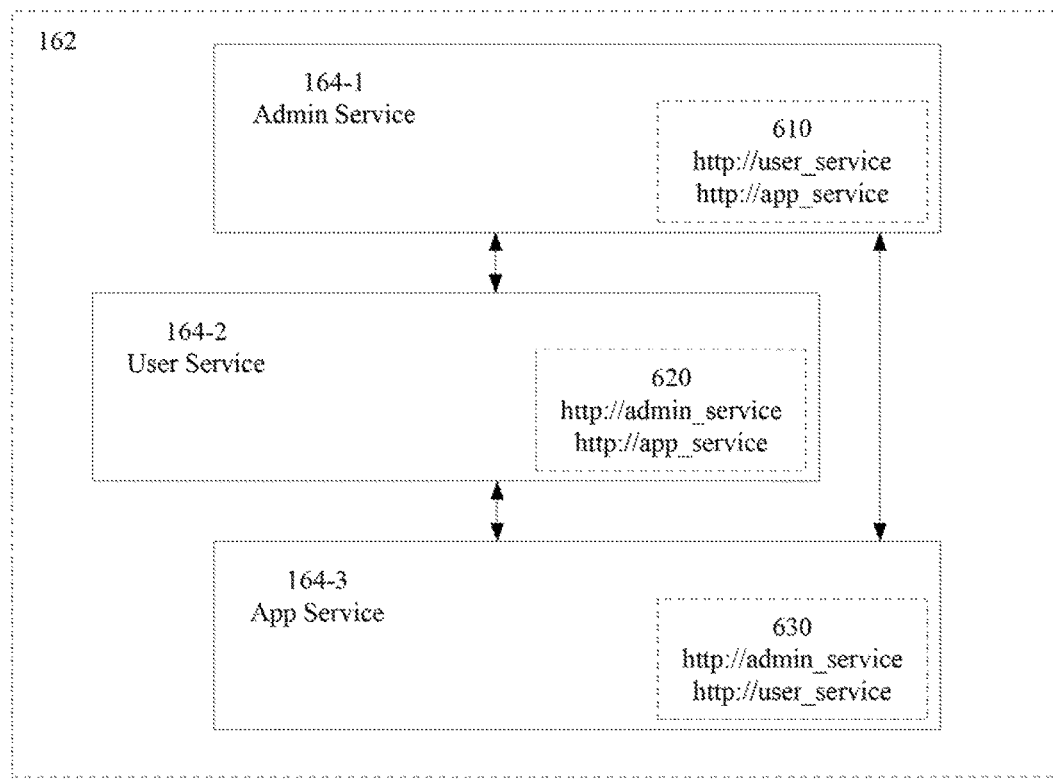
FIG. 6 illustrates service discovery between services within in a container cluster.

FIG. 6 illustrates service discovery between services in a container cluster. As shown in FIG. 6, within a container cluster, a container-based service may access functionality or communicate with other container-based services directly, for example, by using Hypertext Transfer Protocol ("http") requests. For example, when a first container-based service within a container cluster desire to discover, communicate with, and/or access functionality provided by a second container-based service running on the same container cluster, the first container-based service may perform service discovery and discover the second container-based service by service name.

As shown in FIG. 6, Admin Service 164-1 may communicate directly with User Service 164-2 and App Service 164-3 using http://user_service and http://app_service, respectively, as shown in block 610. Similarly, User Service 164-2 may communicate directly with Admin Service 164-1 and App Service 164-3 using http://admin_service and http://app_service, respectively, as shown in block 620. Further, App Service 164-3 may communicate directly with Admin Service 164-1 and User Service 164-2 using http://admin_service and http://user_service, respectively, as shown in block 630. In some embodiments, functionality for service discovery and communication between containers in a container cluster may be provided directly by the container platform and/or a cluster manager (e.g. cluster manager 95) and/or a DNS component (e.g. DNS component 97).

In some embodiments, based on information in the infrastructure independent representation of a hybrid distributed application, a DOE node or agent running on the container cluster may appropriately configure cluster manager (e.g. cluster manager 95) and/or a DNS component (e.g. DNS component 97) to facilitate service discovery and inter-container communication.

Figure 7:
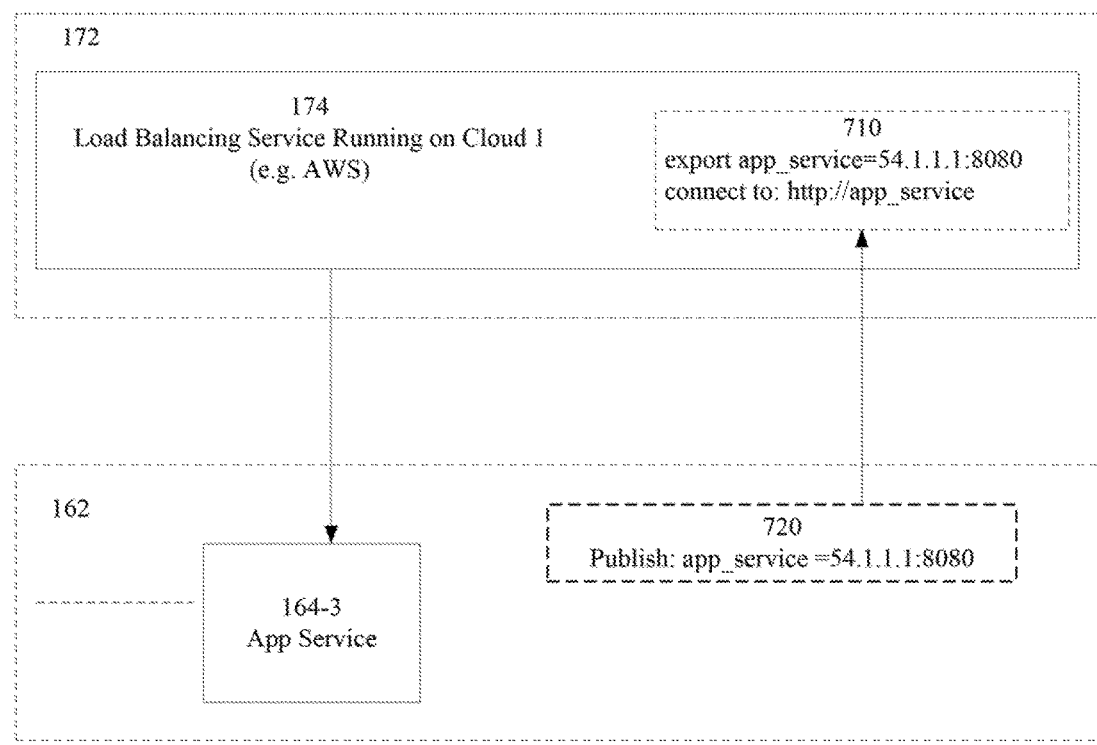
FIG. 7 illustrates the discovery of services in a container cluster by a VM-based service.

FIG. 7 illustrates the discovery of services in a container cluster by a VM-based service. As shown in FIG. 7, the Internet Protocol (IP) address and Port associated with a container-based service (such as App Service 164-3) running in a container cluster may be published. For example, the IP address/Port number associated with app_service may be published as 54.1.1.1:8080 as shown in block 720, where 54.1.1.1 is the IP address and 8080 is the port number. In some embodiments, to facilitate service discovery and/or communication between a VM-based application component/service on one hand and a container-based service on the other, the published IP address and Port number (e.g. the published IP address/Port Number 54.1.1.1:8080 associated with App Service 164-3), may be provided to the VM running the VM-based application component/service as an environment variable. For example, as shown in block 710, the IP address/Port Number 54.1.1.1:8080 associated with App Service 164-3 may be exported. Further, as shown in block 710, the VM-based application/service may then discover and/or initiate communication with the container-based service using http://app_service.

As shown in FIG. 7, App Service 164-3 resides within container cluster 162 (e.g. Kubernetes), while the VM-based application component is Load Balancing Service 174 running on Cloud 1 172 (e.g. AWS). Thus, Load Balancing Service 174 running on Cloud 1 172 is outside of container cluster 162. Accordingly, for Load Balancing Service 174 running on Cloud 1 172 to discover, communicate with and/or access functionality provided by App Service 164-3 running on container cluster 162, the IP address and Port number associated with App Service 164-3 (e.g. 54.1.1.1: 8080) may be published. The published IP address and Port number may be provided to Load Balancing Service 174, for example, by exporting the IP address and Port number associated with App Service 164-3 (e.g. as shown in block 710—export app_service: 54.1.1.1:8080) to an environment variable. Load Balancing Service 174 running on Cloud 1 172 may then access app_service through http://app_service.

In some embodiments, a DOE node or agent running on the container cluster may publish the IP address, which may then be exported by a DOE node running on a cloud associated with the VM desiring to communicate with the container-based service. In some embodiments, the dependencies (e.g. between the VM-based service and the container-based service) may be specified in Workflow Descriptor 210 and DOE nodes may take appropriate actions (e.g. as specified in an event-action map) to facilitate service discovery and communication between the VM-based application component and the container-based service. After appropriate configuration, the VM-based application component may discover, communicate with, and access functionality provided by the container-based service.

Figure 8:
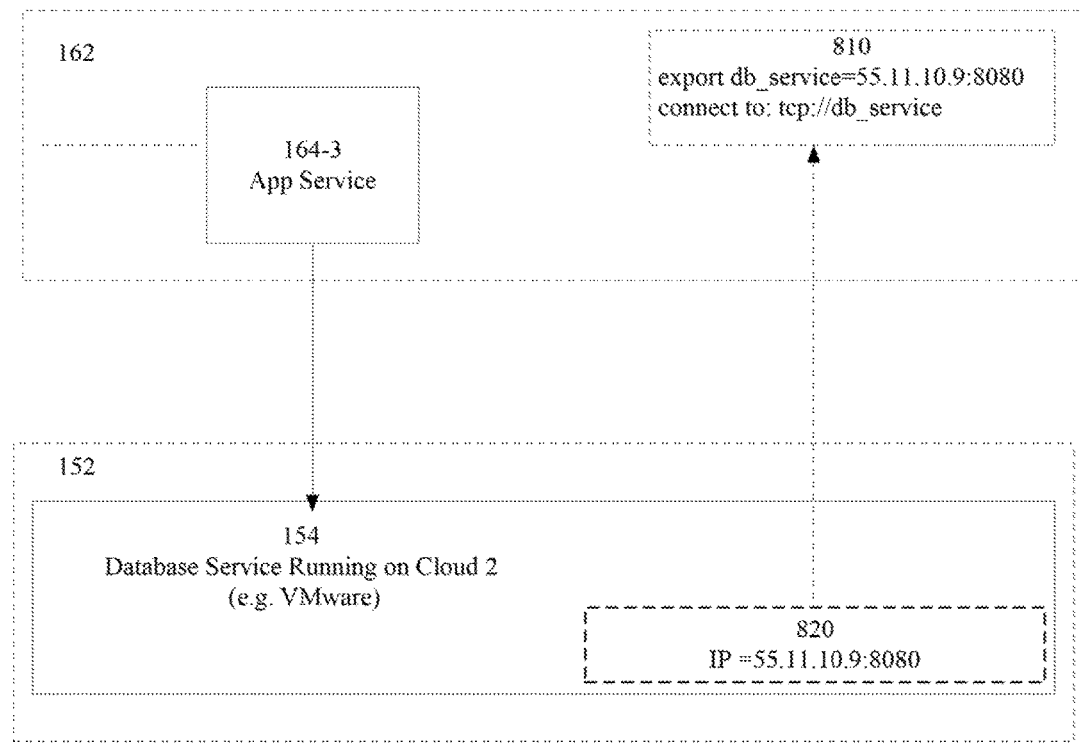
FIG. 8 illustrates the discovery of a VM-based service by services running within a container cluster.

FIG. 8 illustrates the discovery of a VM-based service by services in a container cluster. As shown in FIG. 8, App Service 164-3 resides within container cluster 162, while Database Service 154 may be a VM-based application component running on a VM in Cloud 2 152 (e.g. VMware). App Service 164-3 on container cloud 162 may desire to discover, communicate with and/or access functionality provided by Database Service 154, which may be a VM-based application component running on a VM in Cloud 2 152.

As shown in block 820, Database Service 154 running on a VM in Cloud 2 152 may be associated with a public IP address and Port number, or DNS name. In block 820, the public IP address and Port number of Database Service 154 is shown as 55.11.10.9:8080, where "55.11.10.9" is the IP address and "8080" is the port number. In some embodiments, the IP address and Port number, or DNS name of Database Service 154 may be provided to App Service 164-3. For example, as shown in block 810, IP address and Port number of Database Service 154 may be provided to App Service 164-3 running on container cluster 162, for example, by exporting the IP address and Port number associated with Database Service 154 (e.g. as shown in block 710—export db service: 55.11.10.9:8080) to an environment variable. App Service 164-3 running on container cluster 162 may then access Database Service 154 running on a VM in Cloud 2 152 (e.g. VMware) through tcp://db_service, where "tcp" refers to the transmission control protocol.

Figure 9:
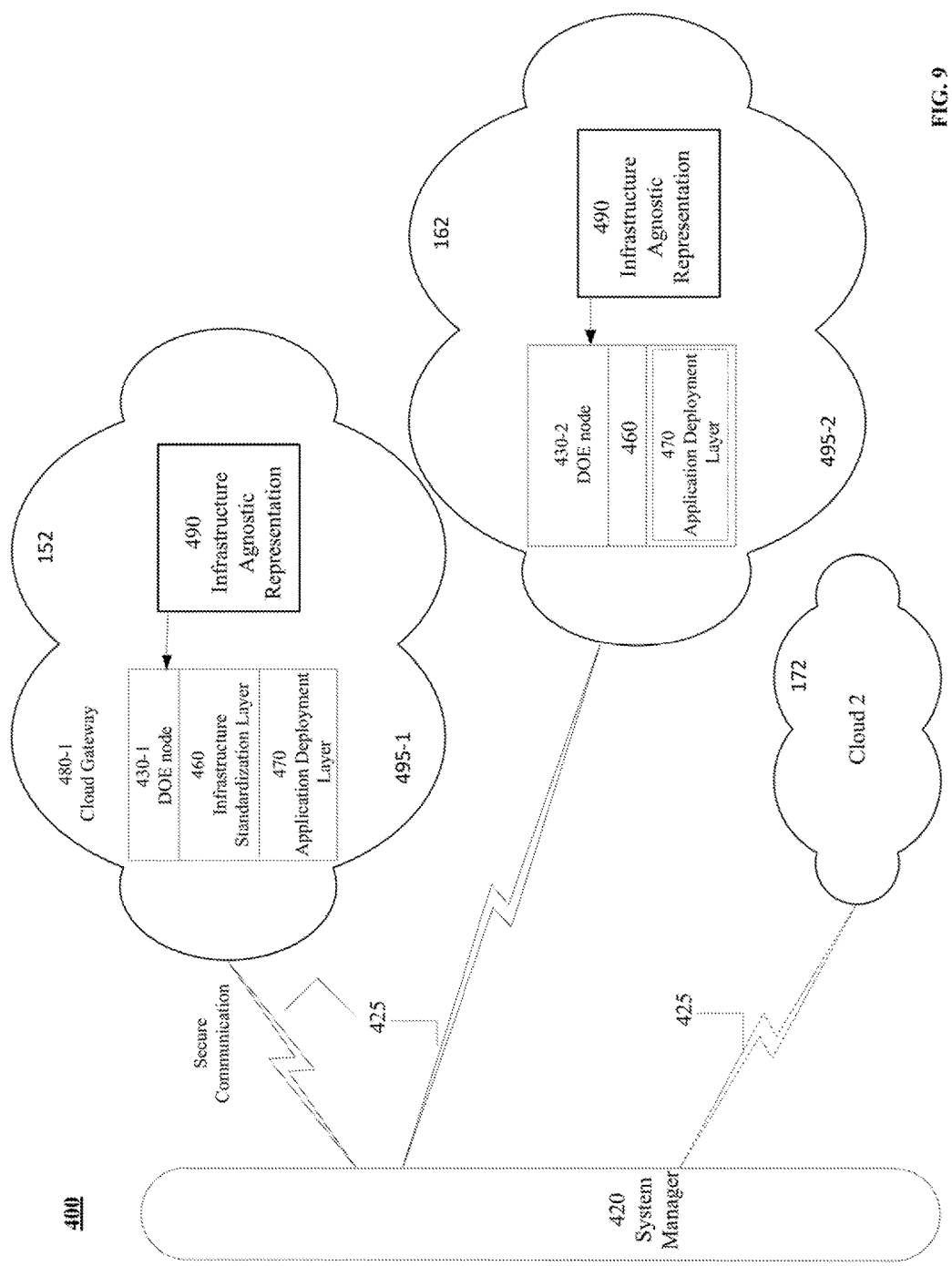
FIG. 9 shows an exemplary system for orchestrating and deploying cloud agnostic representations of a multi-tier application on a plurality of clouds in a manner consistent with disclosed embodiments.

FIG. 9 shows an exemplary system 400 for orchestrating and deploying infrastructure agnostic representations of a distributed application such as a hybrid multi-tier distributed application on a plurality of clouds and container clusters in a manner consistent with disclosed embodiments.

System 400 shown in FIG. 9 is merely exemplary and is used to illustrate the operation of some disclosed embodiments. Techniques and embodiments disclosed may also be used in conjunction with various other cloud-based architectures and/or distributed computing systems. As shown in FIG. 9, system 400 may include System Manager 420, Distributed Orchestration Engine (DOE) 430, Cloud Standardization Layer 460, Application Deployment Layer 470, and Cloud Gateway 480. In some embodiments, DOE 430 may operate as described in relation to FIGS. 4A and/or 4B.

System 400 may include one or more clouds, which are shown as Cloud 1 152 and Cloud 2 172. Further, System 400 may also include container cluster or CaaS 162. Cloud 1 152, Cloud 2 172 and container cluster 162 may communicate with at least one System Manager 420 using communication links 425. In general, system 400 may include a plurality of distinct clouds and/or container clusters, which may be served by a plurality of DOE nodes 430. In some embodiments, the DOE nodes 430 may process events on one more SEMB-Ps 220 (not shown in FIG. 4) and System Manager (or another system entity) may maintain coherence across the SEMB-Ps 220.

Communication links 425 may permit secure communication between System Manager 420 and one or more of DOE 430 (including DOE nodes 430-1 and DOE Node/agent 430-2), Cloud Standardization Layer 460, Application Deployment Layer 470, and/or Cloud Gateway 480. System Manager 420 may be in communication with one or more clouds (e.g. Cloud 1 152 and/or Cloud 2 172) and/or container cluster 162 at any time.

In some embodiments, system 400 may also comprise infrastructure agnostic representations 490 of a distributed computing application. In some instances, the distributed computing application may be a hybrid multi-tier distributed application. Infrastructure agnostic representation 490 of may be used to: obtain a cloud specific implementation of portions of the hybrid multi-tier distributed application (e.g. on Cloud 1 152 and/or Cloud 2 172), and/or to deploy portions of the hybrid multi-tier distributed application on container cluster 162. For example, infrastructure agnostic representation 490 of a hybrid multi-tier distributed application may be used to obtain a cloud specific implementation of portions of the hybrid multi-tier distributed application for Cloud 1 152 (e.g. service 154 on an VMware cloud), a cloud specific implementation of portions of the hybrid multi-tier distributed application for Cloud 2 172 (e.g. service 174 on an AWS cloud), and container cluster specific implementation of portions of the hybrid multi-tier distributed application for container cluster 162 (e.g. (e.g. service cluster S2 164-1, S3 164-2 and S4 164-3 on Kubernetes). System 400 may facilitate orchestration and deployment of infrastructure agnostic representations 490 of a hybrid multi-tier distributed application in a manner consistent with disclosed embodiments.

In some embodiments, System Manager 420 may manage application topology information and coordinate with DOE 430 (including DOE nodes 430-1 and DOE Node/agent 430-2). System Manager 420 may obtain a user-specified or predefined application profile. In some embodiments, Workflow Descriptors 210 (not shown in FIG. 9) may be obtained based, in part, on the application profile. In some embodiments, infrastructure agnostic representation 490 may be obtained based, in part, on information in the application profile and Workflow Descriptors 210 may be obtained from infrastructure agnostic representation 490. For example, System Manager 420 may receive, maintain, and update dependency and configuration information, cloud information, container cluster information, endpoint-based service information, application related information (e.g. application profile) and other data such as job history, policies, etc. in an application profile, which may be stored in an infrastructure agnostic form in infrastructure agnostic representation 490. In some embodiments, System Manager 420 may also facilitate: user views of application files and data on shared storage, movement of application files and data to cloud storage, viewing of mounted volumes on container based storage, and functionality to synchronize the application files and data between clouds and container clusters. In some embodiments, System Manager 420 may serve as a storehouse and manager of information pertaining to user activities. For example, System Manager 420 may act as a management layer to initiate and manage application deployment and monitoring activities.

In addition, System Manager 420 may also manage automated tasks, which, in some embodiments, may have been initiated by DOE 430. System Manager 420 may also call or invoke functions implemented by DOE 430 in order to perform various system related activities. In some embodiments, System Manager may maintain coherence across the SEMB-Ps 220 to ensure that event state is correctly and consistently reflected. For example, when an application is being deployed across multiple clouds, System Manager 420 may receive event completion or other event/action related messages on Cloud 1 152 (e.g. over SEMB-P 220-1, which may be associated with Cloud 1 152) and relay and cause the relaying of the event/action related messages (e.g. received over SEMB-P 220-1) to nodes of DOE 430 on Cloud 2 172 (e.g. over SEMB-P 220-2, which may be associated with Cloud 2 172). Similarly, System Manager 420 may also relay event/action related messages when appropriate between agent or DOE node 430-2 associated with container cluster 162 and DOE node 430-1 associated with cloud 152. Thus, in some embodiments, System Manager 420 may facilitate orchestration and deployment of a hybrid multi-tier distributed application over a plurality of clouds and/or container clusters.

In some embodiments, System Manager 420 may maintain a relational database or data repository with information pertaining to system users including user authentication and authorization information; a list of clouds (152, 172 . . . ) and available cloud configurations for each cloud; a list of container clusters (162 . . . ) and available configurations for each container cluster; information pertaining to applications/entities; policies that a user may have specified, etc. The information available to System Manager 420 may be provided on demand to DOE 430 (including DOE nodes 430-1 and DOE Node/agent 430-2) and/or stored as part of infrastructure agnostic representation 490.

In some embodiments, DOE 430 may use a common application representation, such as infrastructure agnostic representation 490 of a hybrid multi-tier distributed application to deploy and run the hybrid multi-tier distributed application on a plurality of clouds and container clusters. Infrastructure independent representation 490 may specify dependencies, actions, configuration settings, policies, etc. pertaining to the provisioning and utilization of application resources in an infrastructure independent manner (e.g. ignoring cloud-specific or container-cluster specific implementation details, parameters, configuration settings etc.). Functionality provided by infrastructure standardization layer 460 and/or DOE 430 may be used, in part, to orchestrate and deploy infrastructure independent representation 490 on various distinct clouds and/or container clusters.

In some embodiments, DOE 430 may facilitate the deployment, running, and monitoring of applications on various distinct clouds and/or container clusters. For example, DOE 430 may dynamically orchestrate and launch infrastructure agnostic representation 490 of a hybrid multi-tier distributed application on selected clouds Cloud 1 152 (e.g. database service 154 on Cloud 1 152—which may be a private VMware cloud), Cloud 2 172 (e.g. load balancing service 174 on Cloud 2 172—which may be a public AWS cloud), and Container Cluster 162 (e.g. service cluster S2 164-1, S3 164-2 and S4 164-3 on container cluster 162—which may be a Kubernetes cloud) in response to a user entered execute command.

In some embodiments, DOE 430 may facilitate orchestration and deployment of hybrid distributed computing applications without interfering with or adding performance overhead to application execution. Accordingly, in some embodiments, hybrid distributed computing applications may be run directly and natively on selected cloud and container cluster infrastructure. In some embodiments, based, in part, on input provided by DOE 430 and Infrastructure Standardization Layer 460, an Application Deployment Layer 470 (e.g. for a VM-based application component of a hybrid multi-tier distributed application) may select a resource and performance efficient cloud specific implementation for a clouds Cloud 1 152 and Cloud 2 172. In some embodiments, based, in part, on input provided by DOE 430 and Infrastructure Standardization Layer 460, DOE node/agent 430-2 (e.g. for a container-cluster based application component of a hybrid multi-tier distributed application) may select a resource and performance efficient container cluster specific implementation for container cluster 162.

DOE 430 may also maintain routines and other program code that implement algorithms for deploying, optimizing, managing, and monitoring application runs on clouds, container clusters, and endpoint based services. In some embodiments, routines and other functions performed by DOE 430 may be managed and initiated by the System Manager 420 based on an application profile and other user defined criteria, which in some instances, may be embodied in Infrastructure Agnostic Representation 490. DOE 430 may also report the status and results of the various orchestration activities to System Manager 420 (e.g. over one or more SEMB-Ps 220). In one embodiment, DOE 430 may directly query System Manager 420 for information such as application data, policies, and cloud information.

Tasks performed by DOE 430 on clouds Cloud 1 152 and Cloud 2 172, and container cluster 162 may be facilitated by Infrastructure Standardization Layer 460. For example, functionality provided by Infrastructure Standardization Layer 460 may permit DOE 430 to use infrastructure independent representations of application code, such as infrastructure agnostic representation 490 of a multi-tier application, to deploy hybrid multi-tier distributed applications. In some embodiments, the infrastructure independent program code may be common across clouds and/or container cluster and/or endpoint-based services, and Infrastructure Standardization Layer 460 may use Application Deployment Layer 470, which may comprise one or more of: cloud specific plugins, APIs and cloud specific libraries, and/or (optionally) container cluster/CaaS specific plugins, container cluster/CaaS specific APIs and container cluster/CaaS specific libraries to perform tasks for DOE 430 on any given cloud, container cluster or endpoint-based service. In some implementations, the deployment and running of applications and the dynamic management of clusters and other resources may be facilitated by Application Deployment Layer 470. In some embodiments, the dynamic management of VMs, clusters and other resources may be facilitated by using a node management service or agent running on a cloud coordinator/gateway or cloud gateway 480 specific to a cloud or container cluster. Cloud Gateway 480 may also maintain cloud APIs and cloud specific libraries for clouds (e.g. Cloud 1 152 and Cloud 2 172) and/or container cluster APIs and container cluster libraries for container cluster 162 (not shown in FIG. 9).

In some embodiments, Infrastructure Standardization Layer 460 may include functionality to facilitate standardization of library constructs (such as shared storage, network, cluster, security, etc.) across a variety of cloud and container cluster/CaaS providers. Although cloud or container cluster/CaaS providers may have provider-specific Application Programming Interfaces (APIs) and other infrastructure differences, Infrastructure Standardization Layer 460 may provide applications a cloud agnostic or a cloud infrastructure-independent view of resources, including compute, storage, and network resources. For example, Infrastructure Standardization Layer 460 can be a repository for various functional modules that permit applications to utilize various resources (including shared storage, server types, clusters, and features such as queues, security, etc.) on each cloud or container cluster/CaaS in an infrastructure agnostic manner.

In some embodiments, Infrastructure Standardization Layer 460 may maintain resource standardizations for various clouds, such as exemplary clouds 152 and 172, as well as references to cloud-specific implementations of the standardizations for Cloud 1 152 and Cloud 2 172. In some embodiments, Infrastructure Standardization Layer 460 may maintain standardizations for various container clusters, such as exemplary container cluster 162, as well as references to cloud-specific implementations of the standardizations for container cluster 162. In some embodiments, exemplary Infrastructure Standardization Layer 460 may also maintain service-level agreements (SLAs), capability information about each infrastructure resource, information pertaining to cloud or container cluster/CaaS availability, reliability, security, and performance and pricing information. Information may be maintained by Infrastructure Standardization Layer 460 by using metadata XML, files or databases, which, in some implementations, may be persistent. In some implementations, the capability information can be stored as {key, value} pairs in a database. Because individual clouds or container cluster/CaaS may have different capabilities for a standardized resource type, capability information may be indexed by cloud.

In some embodiments, the infrastructure agnostic application representation 490 may be common to a plurality of clouds and the application may be deployed on a specific cloud using infrastructure standardization layer 460. For example, the cloud agnostic application representation 490 may take the form of application descriptors (not shown) such as pattern and system primitives, which may be input to DOE 430. The pattern and system primitives may describe the execution patterns as well as node, storage, communication, and network characteristics. Exemplary application descriptors can include information such as: application software and hardware requirements, application profile (whether memory intensive, Input-Output intensive, CPU intensive, etc.), specification of a distributed computing paradigm, application steps (for workflow style applications).

Cloud specific libraries and cloud APIs, (and optional container cluster specific libraries and container cluster APIs) may comprise a library of implementations for primitives and composite interfaces, respectively, for a specific cloud. In some embodiments, cloud APIs and cloud specific libraries (and optional container cluster specific libraries and container cluster APIs) may be invoked using cloud plugins (or container cluster plugins). For example, cloud plugins may be used to invoke appropriate cloud APIs and routines from cloud specific libraries that permit the deployment and running of applications on clouds, where the applications may have been described using application descriptors and standardized primitives based on Infrastructure Standardization Layer 460.

In some embodiments, when an application is to be deployed, a gateway 480, DOE node 430 or agent, may use cloud APIs and cloud specific libraries (and/or optional container cluster specific libraries and container cluster APIs) to perform deployment and execution tasks for a specific cloud or container cluster. For example, shared storage primitives on Infrastructure Standardization Layer 460 may lead to instantiation of a DFS shared storage implementation on an Amazon™ cloud, while instantiating the shared storage primitive on a Terremark™ cloud will set up NAS/SAN. Similarly, s shared stored primitive for a container cluster may lead to volumes or other persistent storage being mounted.

In some embodiments, gateway 480 may also launch one or more agents (not shown), which can be deployed on a corresponding cloud. In some embodiments, functionality specified or configured by the user may be implemented by gateway 480, DOE 430, and/or Application Deployment Layer 470, which, in some implementations, may include software agents running on the various clouds or container cluster/CaaS. These software agents may monitor application runtime statistics, collect cloud or container cluster/CaaS related information such as but not limited to load information, pricing information, security information etc., and/or collect information related to VMs, container hosts, and/or user actions. In some embodiments, the agents may report the actions performed as well as other task status back to gateway 480, DOE 430 and/or System Manager 420. In some embodiments, information including actions, status, and statistics obtained and reported by an agent may be used by DOE 430 to determine orchestration actions. In some embodiments, the information obtained/reported by an agent may result in one or more events on SEMB-P 220 (not shown in FIG. 9).

Figure 10:
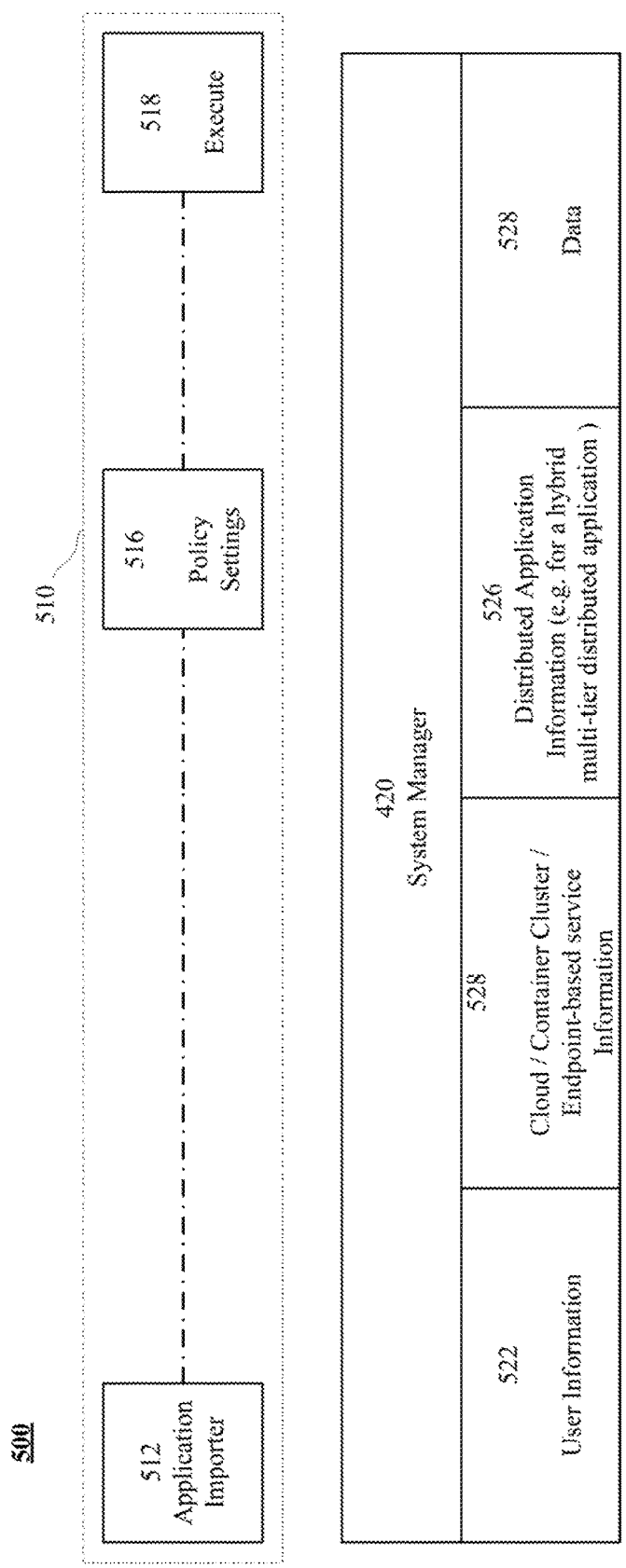
FIG. 10 shows the architecture of an exemplary system manager along with other modules and/or layers that interact with the system manager.

FIG. 10 shows the architecture 800 of exemplary system manager 420 along with other modules and/or layers that interact with System Manager 420. In some embodiments, System Manager 420 may interact with exemplary User Interface Layer 510, which, in turn, may facilitate user configuration of system 400. Exemplary User Interface Layer 510 may comprise Application Importer Module 512, Policy Setting Module 516, and Execute Module 518.

For example, Application Importer Module 512 may be used to import an application profile and/or to create or modify infrastructure agnostic representation 490 of a hybrid multi-tier distributed application and perform other tasks. In addition, as indicated by the dashed lines, Exemplary Application Importer Module 512 may facilitate the importation of new applications and/or the migration of applications, services, and/or images in system 400. In some embodiments, imported applications may be displayed to users using a "desktop-style" view, where icons representing the various applications are shown to the user in a window or browser tab. In some embodiments, pre-published applications or service in a marketplace associated with system 400 (for example, applications in an application library or "app store" associated with or supported by system 400 may be imported by users directly onto their desktop view. In some embodiments, Application Importer Module 512 may allow users to license or buy one or more of pre-published applications or services (e.g. a database service). In general, any software application may be imported using exemplary Application Importer Module 512 in User Interface Layer 510.

Exemplary User Interface Layer 510 may also include various end-user modules that permit user customization and configuration of system 400. In some embodiments, Policy Setting Module 516 may provide appropriate graphical user interfaces and other features to permit users to set, modify, and/or delete policies, which may be implemented using a policy engine. For example, an administrator may set policies that limit one or more clouds, container cluster/CaaS, and/or configurations to specific user(s), limits the clouds, container clusters/CaaS that an application(s) may use or migrate to, limit the monetary budget available for an application run or a series of runs, etc. Further, User Interface Layer 510 may include several other modules (not shown in FIG. 5) to allow users to specify system functionality related to reporting, auditing, billing, and permit viewing of application files and data on shared storage.

In some embodiments, Execute Module 518 may provide user interfaces to permit users to select a cloud agnostic representation of a hybrid multi-tier distributed application and a cloud and container cluster/CaaS to execute a hybrid multi-tier distributed application. In some embodiments, the hybrid multi-tier distributed application may then be orchestrated and launched on the selected second clouds, container clusters/CaaS.

In addition, System Manager 420 may also be used to manage automated tasks, which, in some embodiments, may have been initiated by DOE 430. System Manager 420 may also call or invoke functions implemented by DOE 430 in order to perform various system related activities. For example, System Manager 420 may invoke a secure communications module to facilitate secure communication with a new VM on a cloud 472-*i*. In some embodiments, System Manager 420 may maintain a relational database or data repository with information pertaining to system users including user authentication and authorization information; a list of clouds and available cloud configurations for each cloud; a list of container cluster/CaaS and available container cluster/CaaS configurations for each container cluster/CaaS; policies that a user may have specified, etc.

In some embodiments, DOE 430 may use a common application representation or an infrastructure agnostic representation, such as infrastructure agnostic representation 490 of a hybrid distributed computing application, to deploy and run a single instance of the hybrid distributed computing application on a plurality of distinct clouds and/or container clusters/CaaS. For example, a single instance of a hybrid multi-tier distributed application may be deployed on a first cloud such as Cloud 1 152, a container cluster such as container cluster 162, and a second cloud such as Cloud 2 172 (which may be distinct from the first cloud). The infrastructure agnostic representation 490 of a distributed computing application provides a mechanism to represent the distributed computing application, including application component dependencies, resource usage patterns, etc. without regard to implementation differences on various clouds and/or container clusters/CaaS. For example, infrastructure agnostic representation 490 of a hybrid multi-tier distributed application may be obtained, at least in part, from metadata related to system configuration and application metadata (which, in some instances, may include dependency metadata and workflow descriptors 210). Cloud agnostic representation 490 may be used by DOE 730 to deploy and run a single instance of the underlying hybrid multi-tier distributed application on a plurality of distinct clouds and/or container cluster/CaaS.

As one example, service specific network ingress/egress rules specified as part of service configuration metadata for a service may be embodied in infrastructure agnostic representation 490 of a hybrid multi-tier distributed application. The service specific network ingress/egress rules (as embodied in infrastructure agnostic representation 490 of the hybrid multi-tier distributed application) may be used to facilitate network configuration for the service by DOE 430. For example, service configuration metadata for a MySQL service in an exemplary multi-tier application, may specify an Incoming Port for the MySQL service as Port 3306. Further, the ingress/egress rules may specify that components (e.g. services) in tiers that are directly connected to the MySQL service may communicate with the MySQL service. The ingress/egress rules for the exemplary MySQL service may further specify that components (e.g. services) in tiers that are not directly connected to the MySQL service may not communicate with the MySQL service.

Accordingly, in some embodiments, DOE 430 may use service specific network ingress/egress rules (as embodied in cloud agnostic representation 490 of a multi-tier application) to launch events (e.g. and action such as scripts) specifying network security policies for a cloud and/or container cluster/CaaS (on which the hybrid multi-tier distributed application is being deployed) that will allow components in tiers directly connected to the MySQL service to connect to port 3306 on the node running the service. Further, services in tiers that are not directly connected to the MySQL service may be prevented from accessing port 3306 on node running the MySQL service. In some embodiments, the service ingress/egress rules specified as part of service configuration metadata may be used to enhance network security for the cloud based multi-tier application.

In some embodiments, the common application representation or infrastructure agnostic representation 490 may include application descriptors (not shown), which may be input to DOE 430. In some embodiments, a user may specify applications to import using Application Importer module 512 and application descriptors, which may include various primitives such as pattern and system primitives, which may be used to describe applications to Infrastructure Standardization Layer 460.

DOE 430 may maintain routines and other program code that implement algorithms for orchestrating, deploying, optimizing, managing and monitoring application runs on clouds and/or container clusters/CaaS. In some embodiments, one or more routines and other functions performed by DOE 430 may be managed and initiated by the System Manager 420.

DOE 430 may also report the status and results of the various orchestration activities to System Manager 420. For example, when DOE 430 encounters an event on SEMB-P 220-1 associated with a first cloud (e.g. Cloud 1 152) that pertains to another cloud, DOE 430 (and/or a DOE node) may communicate with System Manager 420 and provide information related to the event. System Manager 420 may then relay the event to DOE 430 (or a DOE node) associated with SEMB-P 220-2 associated with second cloud (e.g. Cloud 2 172), which may process the event. When the event has been completed, System Manager may receive an event completion message or event completion indication from DOE 430 (or a DOE node) associated with SEMB-P 220-2, and may relay the event completion message to DOE (or a DOE node) associated with SEMB-P 220-1, which may process further events or take other actions based on the event completion status. Thus, in some embodiments, System Manager 420 may facilitate orchestration and deployment of a single instance of a hybrid multi-tier distributed application over multiple distinct clouds and/or container clusters/CaaS.

Tasks performed by DOE 430 on Clouds 472 may be facilitated by Infrastructure Standardization Layer 460. For example, functionality provided by Infrastructure Standardization Layer 460 may facilitate the use of infrastructure independent representations of application code (such as infrastructure agnostic representation 490 of a hybrid multi-tier distributed application) by DOE 430 to deploy a hybrid distributed application multi-tier applications across a plurality of clouds and/or container cluster/CaaS. In some embodiments, the infrastructure independent program code may be used by Infrastructure Standardization Layer 460, which may leverage functionality provided by Application Deployment Layer 470 to perform tasks for DOE 430 on any given cloud and/or container cluster/CaaS. For example, Cloud Standardization Layer 460 may use functionality provided cloud specific plugins, cloud specific APIs and cloud specific libraries (or container cluster/CaaS specific plugins, container cluster/CaaS specific APIs and container cluster/CaaS specific libraries) to perform tasks for DOE 430 on any given cloud (and/or container cluster/CaaS).

Figure 11:
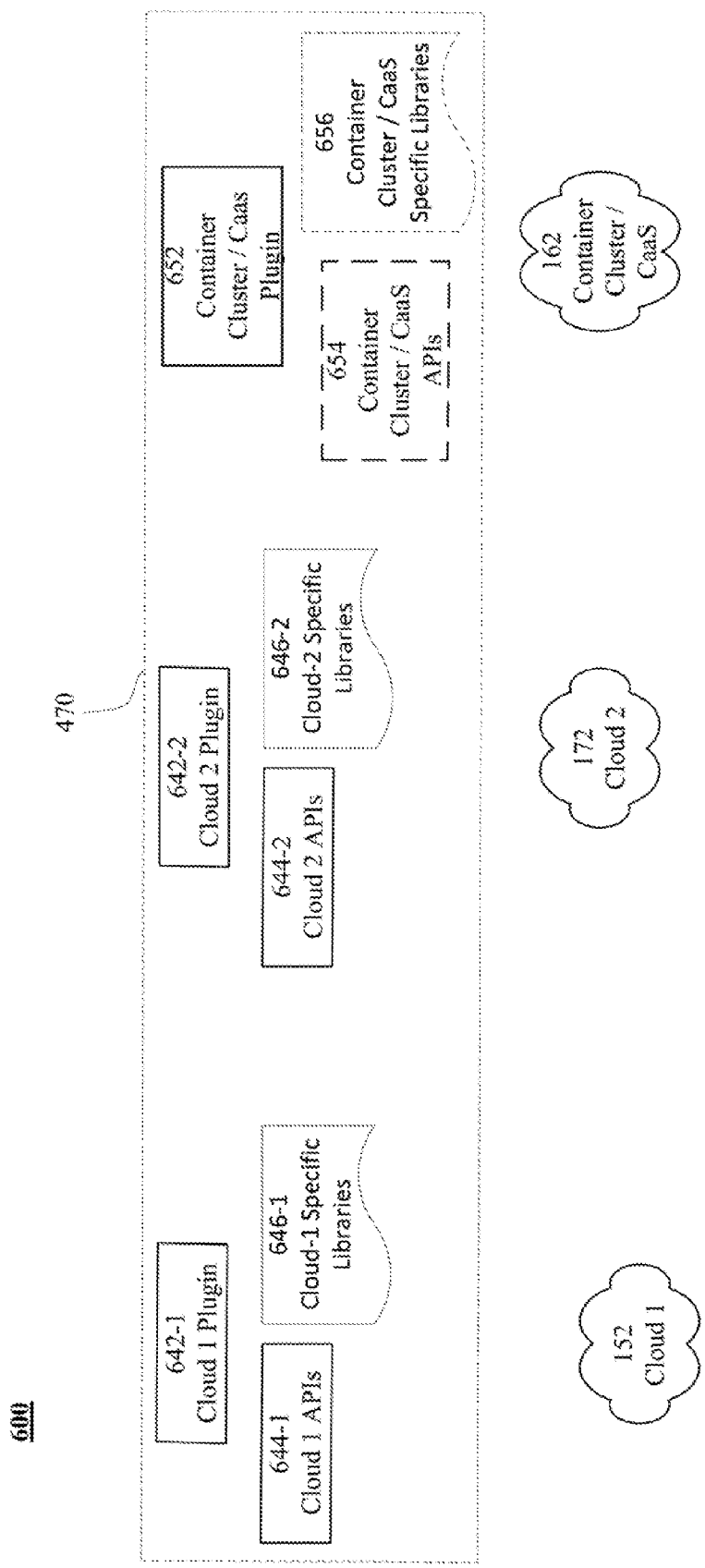
FIG. 11 shows an exemplary architecture of an Application Deployment Layer consistent with disclosed embodiments.

FIG. 11 shows an exemplary architecture 600 of Application Deployment Layer 470. In some implementations, the deployment and running of applications and the dynamic management of container clusters and other cloud resources may be facilitated by Application Deployment Layer 470. Application Deployment Layer 470 may include cloud plugins 642, cloud APIs 644 and cloud specific Libraries 646 and (optionally) one or more of container cluster/CaaS specific plugins 652, container cluster/CaaS specific APIs 654, and container cluster/CaaS specific libraries 656.

In some embodiments, the dynamic management of cloud/container cluster/CaaS resources may be facilitated by using a service such as a node management service running on a cloud gateway 480 and/or a container cluster. The node management service may maintain cloud APIs 644, cloud specific Libraries 646, and any container cluster/CaaS specific APIs 654 and container cluster/CaaS specific libraries 656. The node management service may act as an intermediate layer between the cloud or container cluster/CaaS provider and DOE 430 and facilitate the addition or removal of nodes. Thus, in some embodiments, DOE 430 may effect one or more actions through the node management service.

Cloud specific libraries 646 and cloud APIs 644 (and optional container cluster/CaaS specific APIs 654 and container cluster/CaaS specific libraries 656) may each comprise a library of implementations for primitives and composite interfaces, respectively, for a specific cloud (or container cluster/CaaS). In some embodiments, cloud APIs 644 and cloud specific libraries 646 may be invoked using cloud plugins 642. For example, cloud plugins 642 may be used to invoke appropriate cloud APIs 644 and routines from cloud specific libraries 646 that facilitate the orchestration and deployment of hybrid multi-tier distributed applications (or the VM-based portion of the hybrid multi-tier distributed application) on one or more clouds, where the multi-tier applications may have been described using infrastructure agnostic application descriptors and standardized primitives. Similarly, container cluster/CaaS specific APIs 654 and container cluster/CaaS specific libraries 656 (when present) may be invoked using container cluster/CaaS plugin.

In some embodiments, when a VM is to be deployed on a cloud 472, gateway 480 may use Cloud APIs 644 and Cloud Specific Libraries 646 library to perform deployment and execution tasks for that cloud 472. For example, shared storage primitives on Cloud Standardization Layer 460 may lead to instantiation of a DFS shared storage implementation on an Amazon™ cloud, while instantiating the shared storage implementation on a Terremark™ cloud will set up NAS/SAN.

FIG. 12 shows a flowchart for an exemplary method 700 for orchestrating and deploying a single instance of a distributed computing application (e.g. a hybrid distributed multi-tier application) on a plurality of clouds and/or container clusters. In some embodiments, method 700 may be implemented on a system comprising a processor coupled to a memory and a network interface. The network interface may communicatively couple the processor to the plurality of clouds and/or container clusters. In some embodiments, method 700 may be performed by system manager 420 and/or DOE 430.

In some embodiments, in block 710, an infrastructure independent representation of a hybrid distributed multi-tier application may be obtained, based, in part, on system and pattern constructs associated with the hybrid distributed multi-tier application. The infrastructure independent representation may comprise a representation of an underlying pattern of resource utilization of the application, wherein the underlying pattern of resource utilization of the application is not (a) cloud specific, and is not (b) container cluster specific. In some embodiments, the infrastructure independent representation may further comprise: a representation of execution patterns of the components of the hybrid distributed multi-tier application, wherein the representation of execution patterns comprises dependency information for each of the components of the hybrid distributed multi-tier application.

In block 720, a single instance of the hybrid distributed multi-tier application may be deployed on a plurality of cloud infrastructures and on at least one container cluster, based, in part, on the infrastructure independent representation of the hybrid distributed multi-tier application.

In some embodiments, deploying the single instance of the hybrid distributed multi-tier application on the plurality of cloud infrastructures and on the at least one container cluster may comprise: deploying a first subset of components of the hybrid distributed multi-tier application on a first cloud of the plurality of cloud infrastructures; deploying a second subset of components of the hybrid distributed multi-tier application on a second cloud of the plurality of cloud infrastructures, wherein the second cloud is distinct from the first cloud; and deploying a third subset of components of the hybrid distributed multi-tier application on the at least one container cluster. In some embodiments, the third subset of components of the hybrid distributed multi-tier application may be deployed on the at least one container cluster utilizing a Container as a Service (CaaS) offering.

In some embodiments, the first subset of components of the hybrid distributed multi-tier application and/or the second subset of components of the hybrid distributed multi-tier application may be configured to access services provided by the third subset of components of the hybrid distributed multi-tier application; and the third subset of components of the hybrid distributed multi-tier application may be configured to enable access to services provided by first subset of components of the hybrid distributed multi-tier application and/or the second subset of components of the hybrid distributed multi-tier application.

In some embodiments, the hybrid distributed multi-tier application may comprise a plurality of tiers, where: the first subset of components of the hybrid distributed multi-tier application may form a first tier of the hybrid distributed multi-tier application; the second subset of components of the hybrid distributed multi-tier application may form a second tier of the hybrid distributed multi-tier application; and the third subset of components of the hybrid distributed multi-tier application may form a third tier of the hybrid distributed multi-tier application.

In some embodiments, the single instance of the hybrid distributed multi-tier application may be deployed on the plurality of cloud infrastructures and on the at least one container cluster using a Distributed Orchestration Engine (DOE) comprising a plurality of DOE nodes. In some embodiments, the plurality of DOE nodes may comprise: one or more first DOE nodes, each first DOE node being associated with a distinct cloud infrastructure of the plurality of cloud infrastructures; and at least one second DOE node, the at least one second DOE node being associated with the at least one container cluster. In some embodiments, the single instance of the hybrid distributed multi-tier application may be deployed (e.g. using the DOE) based, in part, on the dependency information for each of the components of the hybrid distributed multi-tier application.

In embodiments where a plurality of system event message buses with persistence (SEMB-P) are used by the DOE (or form part of the DOE), a system manager or another entity associated with the DOE may further ensure coherency between the SEMB-Ps. Maintaining coherence may ensure that the plurality of SEMB-Ps correctly reflect the event state (e.g. event processed, events being processed, and/or events ready for execution etc.).

In some embodiments, the methods and modules described herein may be implemented using a variety of wired and/or wirelessly networked processors, various computers, and computing devices, including mobile devices such as smartphones, notebooks, and handheld computers, and various distributed computing systems including clouds. In some embodiments, the method and modules described herein may be embodied in computer-readable media, including magnetic and/or optical media and various types of non-volatile memory and/or media.

Other embodiments will be apparent to those skilled in the art from consideration of the specification and practice of one or more embodiments of the disclosed herein. It is intended that the specification and examples be considered as exemplary only, with a true scope and spirit of the invention being indicated by the following claims.

What is claimed is:

1. A method comprising:
   at a device including a processor, a non-transitory memory, and a network interface:
   obtaining, based, in part, on system and pattern constructs associated with a hybrid distributed multi-tier application, wherein the hybrid distributed multi-tier application includes at least one container-based tier of container clusters and at least one cloud-based tier, an infrastructure independent representation of the hybrid distributed multi-tier application, wherein the infrastructure independent representation comprises a representation of an underlying pattern of resource utilization of the application, wherein the underlying pattern of resource utilization of the application is not (a) cloud specific and not (b) container cluster specific; and
   deploying a single instance of the hybrid distributed multi-tier application on a plurality of cloud infrastructures and on at least one container cluster, based, in part, on the infrastructure independent representation of the hybrid distributed multi-tier application.

2. The method of claim 1, wherein deploying the single instance of the hybrid distributed multi-tier application on the plurality of cloud infrastructures and on the at least one container cluster comprises:
   deploying a first subset of components of the hybrid distributed multi-tier application on a first cloud of the plurality of cloud infrastructures;
   deploying a second subset of components of the hybrid distributed multi-tier application on a second cloud of the plurality of cloud infrastructures, wherein the second cloud is distinct from the first cloud; and
   deploying a third subset of components of the hybrid distributed multi-tier application on the at least one container cluster.

3. The method of claim 2, wherein the hybrid distributed multi-tier application comprises a plurality of tiers, and:
   the first subset of components of the hybrid distributed multi-tier application form a first tier of the hybrid distributed multi-tier application;
   the second subset of components of the hybrid distributed multi-tier application form a second tier of the hybrid distributed multi-tier application; and
   the third subset of components of the hybrid distributed multi-tier application form a third tier of the hybrid distributed multi-tier application.

4. The method of claim 2, wherein deploying the third subset of components of the hybrid distributed multi-tier application on the at least one container cluster comprises:
   deploying the third subset of components of the hybrid distributed multi-tier application utilizing a Container as a Service (CaaS) offering.

5. The method of claim 2, further comprising:
   configuring the first subset of components of the hybrid distributed multi-tier application and the second subset of components of the hybrid distributed multi-tier application to access services provided by the third subset of components of the hybrid distributed multi-tier application; and configuring the third subset of components of the hybrid distributed multi-tier application to enable access to services provided by first subset of components of the hybrid distributed multi-tier application and the second subset of components of the hybrid distributed multi-tier application.

6. The method of claim 1, wherein deploying the single instance of the hybrid distributed multi-tier application on the plurality of cloud infrastructures and on the at least one container cluster comprises:
   deploying the single instance of the hybrid distributed multi-tier application using a Distributed Orchestration Engine (DOE) comprising a plurality of DOE nodes.

7. The method of claim 6, wherein the plurality of DOE nodes comprise:
   one or more first DOE nodes, each first DOE node being associated with a distinct cloud infrastructure of the plurality of cloud infrastructures; and
   at least one second DOE node, the at least one second DOE node being associated with the at least one container cluster.

8. The method of claim 6, wherein the infrastructure independent representation further comprises:
   a representation of execution patterns of the components of the hybrid distributed multi-tier application, wherein the representation of execution patterns comprises dependency information for each of the components of the hybrid distributed multi-tier application.

9. The method of claim 8, wherein deploying the single instance of the hybrid distributed multi-tier application using the DOE comprises:
   deploying the single instance of the hybrid distributed multi-tier application based, in part, on the dependency information for each of the components of the hybrid distributed multi-tier application.

10. A computer system comprising a processor coupled to a memory and a network interface, wherein the processor is configured to:
obtain, based, in part, on system and pattern constructs associated with a hybrid distributed multi-tier application, wherein the hybrid distributed multi-tier application includes at least one container-based tier of container clusters and at least one cloud-based tier, an infrastructure independent representation of the hybrid distributed multi-tier application, wherein the infrastructure independent representation comprises a representation of an underlying pattern of resource utilization of the application, wherein the underlying pattern of resource utilization of the application is not (a) cloud specific and not (b) container cluster specific; and
deploy, using the network interface, a single instance of the hybrid distributed multi-tier application on a plurality of cloud infrastructures and on at least one container cluster, based, in part, on the infrastructure independent representation of the hybrid distributed multi-tier application.

11. The system of claim 10, wherein to deploy the single instance of the hybrid distributed multi-tier application on the plurality of cloud infrastructures and on the at least one container cluster using the network interface, the processor is configured to:
deploy a first subset of components of the hybrid distributed multi-tier application on a first cloud of the plurality of cloud infrastructures;
deploy a second subset of components of the hybrid distributed multi-tier application on a second cloud of the plurality of cloud infrastructures, wherein the second cloud is distinct from the first cloud; and
deploy a third subset of components of the hybrid distributed multi-tier application on the at least one container cluster.

12. The system of claim 11, wherein the hybrid distributed multi-tier application comprises a plurality of tiers, and:
the first subset of components of the hybrid distributed multi-tier application form a first tier of the hybrid distributed multi-tier application;
the second subset of components of the hybrid distributed multi-tier application form a second tier of the hybrid distributed multi-tier application; and the third subset of components of the hybrid distributed multi-tier application form a third tier of the hybrid distributed multi-tier application.

13. The system of claim 11, wherein to deploy the third subset of components of the hybrid distributed multi-tier application on the at least one container cluster, the processor is configured to:
deploying the third subset of components of the hybrid distributed multi-tier application utilizing a Container as a Service (CaaS) offering.

14. The system of claim 11, wherein the processor is further configured to:
enable access by the first subset of components of the hybrid distributed multi-tier application and the second subset of components of the hybrid distributed multi-tier application to services provided by the third subset of components of the hybrid distributed multi-tier application; and
enable access by the third subset of components of the hybrid distributed multi-tier application to services provided by first subset of components of the hybrid distributed multi-tier application and the second subset of components of the hybrid distributed multi-tier application.

15. The system of claim 10, wherein to deploy the single instance of the hybrid distributed multi-tier application on the plurality of cloud infrastructures and on the at least one container cluster, the processor is configured to:
initiate deployment of the single instance of the hybrid distributed multi-tier application using a Distributed Orchestration Engine (DOE).

16. The system of claim 15, wherein the infrastructure independent representation further comprises:
a representation of execution patterns of the components of the hybrid distributed multi-tier application, wherein the representation of execution patterns comprises dependency information for each of the components of the hybrid distributed multi-tier application.

17. The system of claim 16, wherein deploying the single instance of the hybrid distributed multi-tier application using the DOE comprises:
deploying the single instance of the hybrid distributed multi-tier application based, in part, on the dependency information for each of the components of the hybrid distributed multi-tier application.

18. A non-transitory computer-readable medium comprising instructions to configure a processor to:
obtain, based, in part, on system and pattern constructs associated with a hybrid distributed multi-tier application, wherein the hybrid distributed multi-tier application includes at least one container-based tier of container clusters and at least one cloud-based tier, an infrastructure independent representation of the hybrid distributed multi-tier application, wherein the infrastructure independent representation comprises a representation of an underlying pattern of resource utilization of the application, wherein the underlying pattern of resource utilization of the application is not (a) cloud specific and not (b) container cluster specific; and
deploy a single instance of the hybrid distributed multi-tier application on a plurality of cloud infrastructures and on at least one container cluster, based, in part, on the infrastructure independent representation of the hybrid distributed multi-tier application.

19. The computer-readable medium of claim 18, wherein the instructions to deploy the single instance of the hybrid distributed multi-tier application on the plurality of cloud infrastructures and on the at least one container cluster using the network interface configure the processor to:
deploy a first subset of components of the hybrid distributed multi-tier application on a first cloud of the plurality of cloud infrastructures;
deploy a second subset of components of the hybrid distributed multi-tier application on a second cloud of the plurality of cloud infrastructures, wherein the second cloud is distinct from the first cloud; and
deploy a third subset of components of the hybrid distributed multi-tier application on the at least one container cluster.

20. The computer-readable medium of claim 19, wherein the hybrid distributed multi-tier application comprises a plurality of tiers, and:
the first subset of components of the hybrid distributed multi-tier application form a first tier of the hybrid distributed multi-tier application;

the second subset of components of the hybrid distributed multi-tier application form a second tier of the hybrid distributed multi-tier application; and the third subset of components of the hybrid distributed multi-tier application form a third tier of the hybrid distributed multi-tier application.

\* \* \* \* \*